US011823015B2

(12) United States Patent
Grossman et al.

(10) Patent No.: US 11,823,015 B2
(45) Date of Patent: Nov. 21, 2023

(54) TECHNIQUES FOR CLASSIFYING AND RECOMMENDING SOFTWARE WORKFLOWS

(71) Applicant: AUTODESK, INC., San Francisco, CA (US)

(72) Inventors: Tovi Grossman, Toronto (CA); Benjamin Lafreniere, Toronto (CA); Xu Wang, Pittsburg, PA (US)

(73) Assignee: AUTODESK, INC., San Francisco, CA (US)

( * ) Notice: Subject to any disclaimer, the term of this patent is extended or adjusted under 35 U.S.C. 154(b) by 1129 days.

(21) Appl. No.: 16/247,510

(22) Filed: Jan. 14, 2019

(65) Prior Publication Data

US 2019/0294994 A1 Sep. 26, 2019

Related U.S. Application Data

(60) Provisional application No. 62/647,636, filed on Mar. 24, 2018.

(51) Int. Cl.
*G06N 5/04* (2023.01)
*G06N 20/00* (2019.01)
(Continued)

(52) U.S. Cl.
CPC ............. *G06N 20/00* (2019.01); *G06F 9/453* (2018.02); *G06F 9/4806* (2013.01);
(Continued)

(58) Field of Classification Search
CPC .......... G06N 20/00; G06N 5/04; G06N 7/005; G06F 9/453; G06F 16/24578;
(Continued)

(56) References Cited

U.S. PATENT DOCUMENTS

2014/0074545 A1* 3/2014 Minder .............. G06Q 10/0633 705/7.27
2017/0323233 A1* 11/2017 Bencke .............. G06Q 10/0633

OTHER PUBLICATIONS

Gasparic, Marko, Tural Gurbanov, and Francesco Ricci. "Context-aware integrated development environment command recommender systems." In 2017 32nd IEEE/ACM International Conference on Automated Software Engineering (ASE), pp. 688-693. IEEE, 2017. (Year: 2017).*

(Continued)

*Primary Examiner* — Casey R. Garner
(74) *Attorney, Agent, or Firm* — Artegis Law Group, LLP

(57) ABSTRACT

In various embodiments, a pattern-based recommendation subsystem automatically recommends workflows for software-based tasks. In operation, the pattern-based recommendation subsystem computes an expected distribution of frequencies across command patterns based on different distributions of frequencies across the command patterns. The expected distribution of frequencies is associated with a target user, and each different distribution of frequencies is associated with a different user. The pattern-based recommendation subsystem then applies a set of commands associated with the target user to a trained machine-learning model to determine a target distribution of weights applied to a set of tasks. Subsequently, the pattern-based recommendation subsystem determines a training item based on the expected distribution of frequencies and the target distribution of weights. The pattern-based recommendation subsystem generates a recommendation that specifies the training item. Finally, the pattern-based recommendation subsystem transmits the recommendation to a user to assist the user in performing a particular task.

20 Claims, 8 Drawing Sheets

(51) Int. Cl.
*G06F 16/2457* (2019.01)
*G06F 9/451* (2018.01)
*G06F 9/48* (2006.01)
*G06F 11/34* (2006.01)
*G06F 17/18* (2006.01)
*G06N 7/01* (2023.01)

(52) U.S. Cl.
CPC ........ *G06F 9/4881* (2013.01); *G06F 11/3452* (2013.01); *G06F 16/24578* (2019.01); *G06F 17/18* (2013.01); *G06N 5/04* (2013.01); *G06N 7/01* (2023.01)

(58) Field of Classification Search
CPC .. G06F 9/4806; G06F 9/4881; G06F 11/3452; G06F 17/18
See application file for complete search history.

(56) References Cited

OTHER PUBLICATIONS

Zolaktaf, Sedigheh, and Gail C. Murphy. "What to learn next: Recommending commands in a feature-rich environment." In 2015 IEEE 14th International Conference on Machine Learning and Applications (ICMLA), pp. 1038-1044. IEEE, 2015. (Year: 2015).*
Dev, Himel, and Zhicheng Liu. "Identifying frequent user tasks from application logs." In Proceedings of the 22nd international conference on intelligent user interfaces, pp. 263-273. 2017. (Year: 2017).*
Liu, Xumin. "Unraveling and learning workflow models from interleaved event logs." In 2014 IEEE International Conference on Web Services, pp. 193-200. IEEE, 2014. (Year: 2014).*
Lattas, Alexander, and Diomidis Spinellis. "Echoes from space: grouping commands with large-scale telemetry data." In Proceedings of the 40th International Conference on Software Engineering: Software Engineering in Practice, pp. 105-114. 2018. (Year: 2018).*
Agarwal et al., "Mining Association Rules Between Sets of Items in Large Databases", In Proceedings of the 1993 ACM SIGMOD International Conference on Management of Data (SIGMOD '93). ACM, New York, NY, USA, http://dx.doi.org/10.1145/170035.170072, 1993, pp. 207-216.
Agarwal et al., "Mining Sequential Patterns", In Proceedings of the Eleventh International Conference on Data Engineering (ICDE '95). IEEE Computer Society, Washington, DC, USA, http://dl.acm.org/citation.cfm?id=645480.655281, 1995, pp. 3-14.
Adar et al., "Large Scale Analysis of Web Revisitation Patterns", In Proceedings of the SIGCHI Conference on Human Factors in Computing Systems (CHI '08). ACM, New York, NY, USA, 1197-1206. https://doi.org/10.1145/1357054.1357241, 2008, 10 pages.
"About the Screencast API and SDK", Autodesk, https://help.autodesk.com/view/SCREENCAST/2016/ENU/?guid=GUID-0562017F-71C4-4EC6-A30E-4BD901382F1F, retrieved Apr. 6, 2020, 4 pages.
Banovic et al., Waken: reverse engineering usage information and interface structure from software videos. In Proceedings of the 25th annual ACM symposium on User interface software and technology (UIST '12). ACM, New York, NY, USA, 83-92. https://doi.org/10.1145/2380116.2380129, 2012, 10 pages.
Bateman et al., "The search dashboard: how reflection and comparison impact search behavior", In Proceedings of the SIGCHI Conference on Human Factors in Computing Systems (CHI '12). ACM, New York, NY, USA, 1785-1794. http://dx.doi.org/10.1145/2207676.2208311, 2012, 10 pages.
Blei et al., "Latent Dirichlet Allocation", Journal of Machine Learning Research 3 (2003) pp. 993-1022.
Cule et al., "A new constraint for mining sets in sequences", In Proceedings of the 2009 SIAM International Conference on Data Mining. 317-328. http://dx.doi.org/10.1137/1.9781611972795.28, pp. 317-328.
Dev et al., "Identifying Frequent User Tasks from Application Logs", In Proceedings of the 22nd International Conference on Intelligent User Interfaces (IUI '17). ACM, New York, NY, USA, https://doi.org/10.1145/3025171.3025184, Mar. 13-16, 2017, pp. 263-273.
"Gensim Library", https://radimrehurek.com/gensim/, retrieved Apr. 6, 2020, 3 pages.
Griffiths et al., Topics in semantic representation. Psychological review, 2007, vol. 114, No. 2, pp. 211-244.
Grossman et al., "A Survey of Software Learnability:Metrics, Methodologies and Guidelines", In Proceedings of the SIGCHI Conference on Human Factors in Computing Systems (CHI '09). ACM, New York, NY, USA, https://doi.org/10.1145/1518701.1518803, Apr. 7, 2009, pp. 649-658.
Grossman et al.,. ToolClips: an investigation of contextual video assistance for functionality understanding. In Proceedings of the SIGCHI Conference on Human Factors in Computing Systems (CHI '10). ACM, New York, NY, USA, https://doi.org/10.1145/1753326.1753552, Apr. 10-15, 2010, pp. 1515-1524.
Huynh et al. Discovery of activity patterns using topic models. In Proceedings of the 10th international conference on Ubiquitous computing (UbiComp '08). ACM, New York, NY, USA, 10-19. http://dx.doi.org/10.1145/1409635.1409638, 2008, 10 pages.
Kim et al., "Learnersourcing subgoal labeling to support learning from how-to videos", In CHI '13 Extended Abstracts on Human Factors in Computing Systems (CHI EA '13). ACM, New York, NY, USA, https://doi.org/10.1145/2468356.2468477, pp. 685-690.
Kim et al., "Crowdsourcing step-by-step information extraction to enhance existing how-to videos", In Proceedings of the SIGCHI Conference on Human Factors in Computing Systems (CHI '14). ACM, New York, NY, USA, https://doi.org/10.1145/2556288.2556986, 2014, pp. 4017-4026.
Kim et al., "Data-driven interaction techniques for improving navigation of educational videos", In Proceedings of the 27th annual ACM symposium on User interface software and technology (UIST '14). ACM, New York, NY, USA, https://doi.org/10.1145/2642918.2647389, Oct. 5-8, 2014, pp. 563-572.
Lafreniere et al., "Community Enhanced Tutorials: Improving Tutorials with Multiple Demonstrations", In Proceedings of the SIGCHI Conference on Human Factors in Computing Systems (CHI '13). ACM, New York, NY, USA, https://doi.org/10.1145/2470654.2466235, pp. 1779-1788.
Lafreniere et al., "Investigating the feasibility of extracting tool demonstrations from in-situ video content", In Proceedings of the SIGCHI Conference on Human Factors in Computing Systems (CHI '14). ACM, New York, NY, USA, 4007-4016. http://dx.doi.org/10.1145/2556288.2557142, CHI 2014, pp. 4007-4016.
Leshed e al., "CoScripter: Automating & Sharing How-To Knowledge in the Enterprise", In Proceedings of the BIGCHI Conference on Human Factors in Computing Systems (CHI '08). ACM, New York, NY, USA, https://doi.org/10.1145/1357054.1357323, Apr. 5-10, 2008, pp. 1719-1728.
Li et al., Design and evaluation of a command recommendation system for software applications. ACM Trans. Comput.-Hum. Interact. 18, 2, Article 6. http://dx.doi.org/10.1145/1970378.1970380, 2011, pp. 3369-3378.
Li et al., CADament: a gamified multiplayer software tutorial system. In Proceedings of the SIGCHI Conference on Human Factors in Computing Systems (CHI '14). ACM, New York, NY, USA, https://doi.org/10.1145/2556288.2556954, 2014, pp. 3369-3378.
Linton et al., Recommender systems for learning: building user and expert models through long-term observation of application use. User Modeling and User-Adapted Interaction, 2000, vol. 10 No. 2-3, pp. 181-208.
Linton et al., Peter Schaefer (2000). OWL: A recommender system for organization-wide learning. Educational Technology & Society, 3(1), 62-76.
Mackay, David J.C., "Information Theory, Inference, and Learning Algorithms", (First ed.). Cambridge University Press. 2003, p. 34.
Malacria et al., Skillometers: reflective widgets that motivate and help users to improve performance. In Proceedings of the 26th annual ACM symposium on User interface software and technology

(56) References Cited

OTHER PUBLICATIONS (UIST '13). ACM, New York, NY, USA, http://dx.doi.org/10.1145/2501988.2501996, Oct. 8-11, 2013, pp. 321-330.

Mannila et al., "Discovery of Frequent Episodes in Event Sequences", Data Mining and Knowledge Discovery 1, 1, 3, (Jan. 1997), http://dx.doi.org/10.1023/A:1009748302351, 1997, pp. 259-289.

Matejka et al. "CommunityCommands: command recommendations for software applications", In Proceedings of the 22nd annual ACM symposium on User interface software and technology (UIST '09). ACM, New York, NY, USA, https://doi.org/10.1145/1622176.1622214, 2009, pp. 193-202.

Matejka et al., "Ambient Help", In Proceedings of the SIGCHI Conference on Human Factors in Computing Systems (CHI '11). ACM, New York, NY, USA, https://doi.org/10.1145/1978942.1979349, May 7-12, 2011, pp. 2751-2760.

Obendorf et al., "Web Page Revisitation Revisited: Implications of a Long-term Click-stream Study of Browser Usage", In Proceedings of the SIGCHI Conference on Human Factors in Computing Systems (CHI '07). ACM, New York, NY, USA, https://doi.org/10.1145/1240624.1240719, Apr. 28-May 3, 2007, pp. 597-606.

Park et al., "A Large-Scale Study of User Image Search Behavior on the Web", In Proceedings of the 33rd Annual ACM Conference on Human Factors in Computing Systems (CHI '15). ACM, New York, NY, USA, https://doi.org/10.1145/2702123.2702527, 2015, 985-994 pages.

Pennacchiotti et al., Investigating Topic Models for Social Media User Recommendation In Proceedings of the 20th international conference companion on World wide web (WWW '11). ACM, New York, NY, USA, http://dx.doi.org/10.1145/1963192.1963244, Mar. 28-Apr. 1, 2011, pp. 101-102.

Perer et al., Frequence: interactive mining and visualization of temporal frequent event sequences. In Proceedings of the 19th international conference on Intelligent User Interfaces (IUI '14). ACM, New York, NY, USA, http://dx.doi.org/10.1145/2557500.2557508, Feb. 24-27, 2014, pp. 153-162.

Ramage et al., "Labeled LDA: a supervised topic model for credit attribution in multi-labeled corpora", In Proceedings of the 2009 Conference on Empirical Methods in Natural Language Processing: vol. 1-vol. 1 (EMNLP '09), vol. 1. Association for Computational Linguistics, Stroudsburg, PA, USA, 2009, pp. 248-256.

Singal, Amit, "Modern Information Retrieval: A Brief Overview", IEEE Data Engineering Bulletin, vol. 24, No. 4, 2001, pp. 35-43.

SPMF Library. http://www.philippe-fournier-viger.com/spmf/, Retrieved Apr. 6, 2020, 1 page.

Wang et al., "Unsupervised Clickstream Clustering for User Behavior Analysis", In Proceedings of the 34th Annual ACM Conference on Human Factors in Computing Systems (CHI '16). ACM, New York, NY, USA, https://doi.org/10.1145/2858036.2858107, 2016, pp. 225-236.

Wen et al., Identifying Latent Study Habits by Mining Learner Behavior Patterns in Massive Open Online Courses. In Proceedings of the 23rd ACM International Conference on Conference on Information and Knowledge Management (CIKM '14). ACM, New York, NY, USA, http://dx.doi.org/10.1145/2661829.2662033, 2014, pp. 1983-1986.

Yan et al., "A Biterm Topic Model for Short Texts", In Proceedings of the 22nd international conference on World Wide Web (WWW '13). ACM, New York, NY, USA, 1445-1456. https://doi.org/10.1145/2488388.2488514, May 13-17, 2013, pp. 1445-1456.

Zhang et al., "Novelty and Redundancy Detection in Adaptive Filtering", In Proceedings of the 25th annual International ACM SIGIR conference on Research and development in in-formation retrieval (SIGIR '02). ACM, New York, NY, USA, http://dx.doi.org/10.1145/564376.564393, Aug. 11-15, 2002, pp. 81-88.

Non-Final Office Action received for U.S. Appl. No. 16/247,507, dated Aug. 18, 2021, 81 pages.

Khan et al., "Exploring Personalized Command Recommendations based on Information Found in Web Documentation", Mar. 29-Apr. 1, 2015, Atlanta, GA, USA, 11 pages.

Damevski et al., Predicting Future Developer Behavior in the IDE Using Topic Models, Nov. 2018, 12 pages.

Adar et al., CommandSpace: Modeling the Relationships between Tasks, Descriptions and Features, Oct. 5-8, 2014, Honolulu, HI, USA, 10 pages.

Li et al., Design and Evaluation of a Command Recommendation System for Software Applications, 2009, 35 pages.

Final Office Action received for U.S. Appl. No. 16/247,507 dated Mar. 7, 2022, 72 pages.

Non Final Office Action received for U.S. Appl. No. 16/247,507 dated Sep. 6, 2022, 33 pages.

Jin et al., "Task-Oriented Web User Modeling for Recommendation", https://link.springer.com/content/pdf/10.1007/11527886_15.pdf, 2005, pp. 109-118.

Notice of Allowance received for U.S. Appl. No. 16/247,507 dated Mar. 17, 2023, 17 pages.

Gasparic et al., "Modeling Context-Aware Command Recommendation and Acceptance in an IDE", https://ieeexplore.ieee.org/abstract/document/7181496, May 2015, 5 pages.

Wiebe et al., "Exploring User Attitudes Towards Different Approaches to Command Recommendation in Feature-Rich Software", https://dl.acm.org/doi/pdf/10.1145/2856767.2856814, Mar. 7-10, 2016, pp. 43-47.

* cited by examiner

TECHNIQUES FOR CLASSIFYING AND RECOMMENDING SOFTWARE WORKFLOWS

CROSS-REFERENCE TO RELATED APPLICATIONS

This application claims priority benefit of the U.S. Provisional Patent Application "TECHNIQUES FOR CLASSIFYING AND RECOMMENDING SOFTWARE WORKFLOWS" filed on Mar. 24, 2018 and having Ser. No. 62/647,636. The subject matter of this related application is hereby incorporated herein by reference.

BACKGROUND

Field of the Various Embodiments

Embodiments of the present invention relate generally to computer-aided design and, more specifically, to techniques for classifying and recommending software workflows.

Description of the Related Art

In a typical approach to using software for performing various tasks, a user manually develops a sequence of commands known as a "workflow" based on the understanding the user has of one or more software applications. Oftentimes, there are hundreds or even thousands of different commands that are supported by each software application. Furthermore, the commands supported by each software application may change over time. Consequently, manually optimizing a workflow can be difficult, if not impossible, for the user. As a result, the user may execute a particular workflow to perform a given task when other, more efficient, workflows for performing that same task are available.

For example, a user could establish a primarily manual workflow for generating support structures that function as scaffolding for a 3D model during 3D printing using a first version of a computer-aided design (CAD) application. A second version of the CAD application could then be subsequently released that includes new commands that facilitate a more efficient, primarily automated workflow for generating support structures. However, because the user is unfamiliar with the new commands, the user could end up continuing to use the primarily manual workflow despite upgrading to the second version of the CAD application.

In an attempt to address the above issue, command-based recommendation tools have been developed. A typical command-based recommendation tool collects historical command logs of individual commands executed by a wide variety of users and determines the command frequency with which each user executes each command. When a target user requests a recommendation of new commands, the command-based recommendation tool identifies other "similar" users based on the command frequencies. The command-based recommendation tool then identifies "unfamiliar" commands that many of the similar users frequently executed, but that the target user has not previously executed. The command-based recommendation tool recommends the unfamiliar commands to the target user. The target user can then modify existing workflows or generate new workflows based on the recommendation.

One drawback of command-based recommendation tools is that the recommended commands are not necessarily applicable to tasks performed by the target user. For example, the recommended commands could be suitable for tasks involving three-dimensional (3D) objects that many of the similar users perform, but could be unsuitable for tasks involving 2D objects that the target user performs. Another drawback is that the target user may be aware of the existence of the recommended commands, but may not know how to effectively use the recommended commands to automate actual tasks performed by the target user. In such cases, the target user is unlikely to generate new workflows or modify existing workflows based on the recommendation.

As the foregoing illustrates, what is needed in the art are more effective techniques for generating workflows for users when performing software-based tasks.

SUMMARY

One embodiment of the present invention sets forth a computer-implemented method for automatically recommending workflows for software-based tasks. The method includes computing an expected distribution of frequencies across a set of command patterns based on different distributions of frequencies across the set of command patterns, where the expected distribution of frequencies is associated with a target user, and each different distribution of frequencies is associated with a different user; applying a first set of commands associated with the target user to a trained machine-learning model to determine a target distribution of weights applied to a set of tasks, where the trained machine-learning model maps different sets of commands to different distributions of weights applied to the set of tasks; determining a first training item from a plurality of training items based on the expected distribution of frequencies and the target distribution of weights; generating a recommendation that specifies the first training item; and transmitting the recommendation to a user to assist the user in performing a particular task.

At least one advantage of the disclosed techniques relative to the prior art is that the recommendation is automatically generated based on classifying sets of commands instead of individual commands. Classifying commands in the context of other commands and then targeting the recommendation based on the resulting classifications increases the likelihood that the recommendation is relevant to the target user. Further, unlike prior art approaches, the recommendation can provide information on how to use familiar commands in unfamiliar ways to efficiently automate tasks. These technical advantages provide a substantial technological advancement over prior art solutions.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
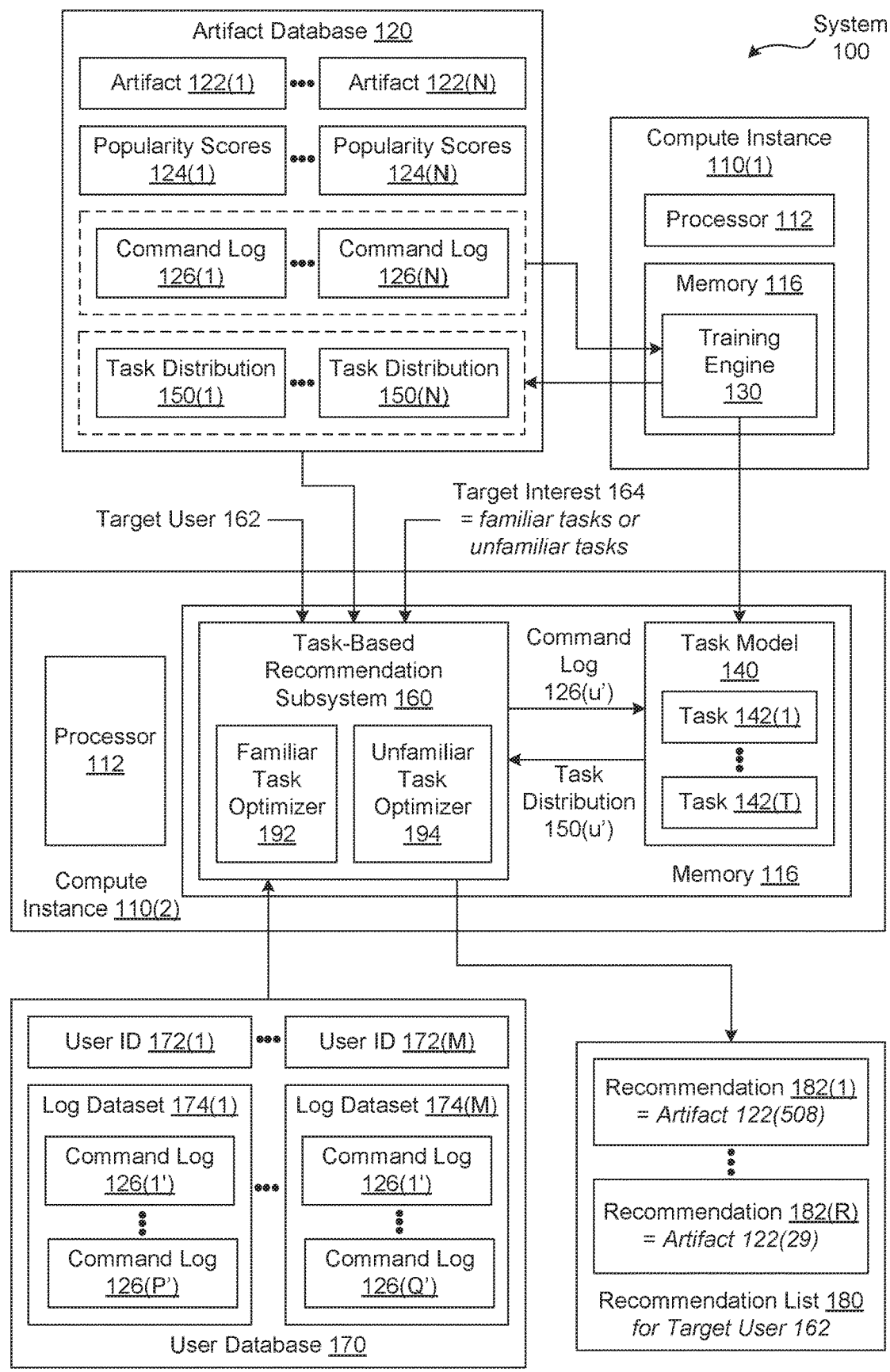
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, two compute instances 110, an artifact database 120, and a user database 170. In alternate embodiments, the system 100 may include any number of compute instances 110 and any number and type of databases, in any combination. For explanatory purposes, multiple instances of like objects are denoted with reference numbers identifying the object and parenthetical numbers or characters identifying the instance where needed.

Any number of the components of the system 100 may be distributed across multiple geographic locations. Further, any number of the components of the system 100 may be included in or distributed across one or more stand-alone devices, distributed computing environments, or cloud computing environments (i.e., encapsulated shared resources, software, data, etc.) in any combination.

The compute instance 110 includes, without limitation, a processor 112 and a memory 116. Examples of compute instances 110 include, without limitation, a server, a cloud instance, a game console, a smartphone, a smart television (TV), a laptop, a tablet, and a desktop computer. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. In alternative embodiments, each of the compute instances 110 may include any number of processors 112.

The memory 116 stores content, such as software applications and data, for use by the processor 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, each of the compute instances 110 included in the system 100 is configured to implement one or more applications. For explanatory purposes only, each application and each subsystem is depicted as residing in the memory 116 of a single compute instance 110 and executing on a single processor 112 of the single compute instance 110. However, as persons skilled in the art will recognize, the functionality of each application and subsystem may be distributed across any number of other subsystems and/or applications that reside in the memories 116 of any number of the compute instances 110 and execute on any number of the processors 112 of any number of the compute instances 110 in any combination. Further, the functionality of any number of subsystems and/or applications may be consolidated into a single application or subsystem.

In particular, the compute instances 110 are configured to generate workflows for users when performing software-based tasks. More precisely, the system 100 provides information on how to develop new workflows or improve existing workflows to efficiently automate tasks that are of interest to the target user 162. As referred to herein, a workflow is any sequence of commands associated with any number and type of software applications. As persons skilled in the art will recognize, each software application may be associated with hundreds or thousands of commands. Further, many commands can be used in a variety of different ways to accomplish a wide variety of goals. And, the number and usage of commands support by each software application may vary between different versions of the software application. Consequently, manually optimizing a workflow can be difficult, if not impossible, for the target user 162. As a result, the target user 162 may execute a particular workflow to perform a given task when other, more efficient, workflows for performing that same task are available.

In an attempt to address the above issue, command-based recommendation tools have been developed. A typical command-based recommendation tool identifies "unfamiliar" commands that many users that are "similar" to the target user 162 have frequently executed, but that the target user 162 has not previously executed. The command-based recommendation tool can make this identification based on different historical sets of commands associated with the various users. Subsequently, the command-based recommendation tool recommends the unfamiliar commands to the target user 162. The target user 162 can then modify existing workflows or generate new workflows based on the recommendation.

One drawback of command-based recommendation tools is that command-based recommendation tools typically recommend individual commands that are not necessarily applicable to tasks performed by the target user 162. Another drawback is that the target user 162 may be aware of the existence of the recommended commands, but may not know how to effectively use the recommended commands to automate actual tasks performed by the target user 162. In such cases, the target user 162 is unlikely to generate new workflows or modify existing workflows based on the recommendation.

Automatically Recommending Workflows Based on Inferred Tasks

To address the above problems, the system 100 includes, without limitation, a training engine 130, a task model 140, and a task-based recommendation subsystem 160. In general, the training engine 130 generates the task model 140 that enables the task-based recommendation subsystem 160 to identify efficient workflows that align with the interests of a target user 162 based on classifying the tasks that the target user 162 has previously performed. As shown, the training engine 130 resides in the memory 116 and executes on the processor 112 of the compute instance 110(1). The task model 140 and the task-based recommendation subsystem 160 reside in the memory 116 and execute on the processor 112 of the compute instance 110(2).

During a training phase, the training engine 130 generates the task model 140 based on command logs 126 included in the artifact database 120. Initially, the artifact database 120 includes, without limitation, any number of artifacts 122(1)-122(N), the command logs 126(1)-126(N), and popularity scores 124(1)-124(N). As part of generating the task model 140, the training engine 130 generates task distributions 150(1)-150(N) and then stores the task distributions 150 in the artifact database 120. Each of the artifacts 122 may be any item that is associated directly or indirectly with a sequence of commands for any number and type of software applications. A sequence of commands is also referred to herein as a "workflow." Examples of artifacts include, without limitation, videos, websites, documents, and tutorials that describe workflows. Each of the artifacts 122 is also referred to herein as a "training item."

The artifact 122(t) is associated with the command log 126(t), the popularity score 124(t), and the task distribution 150(t). The command log 126(t) specifies any number and type of commands in a temporal order in any technically feasible fashion. For instance, in some embodiments, the command log 126(1) for a training video may specify the commands that an engineer depicted in the video executes in the order that the engineer executes the commands. In some embodiments, each command included in the command log 126 is associated with a single software application. In other embodiments, each command in the command log 126 may be associated with a different software application. Each of the commands logs 126 is also referred to herein as a "set of commands."

The popularity score 124(t) indicates a popularly of the artifact 122(t) in any technically feasible fashion. For instance, in some embodiments, the popularity score 124(t) is a total number of times the artifact 122(t) has been viewed. In other embodiments, the popularity score 124(4) is a total number of different users that have viewed the artifact 122(t). In yet other embodiments, the popularity score 124(4) is based on rankings that users have assigned to the artifact 122(t).

The training engine 130 performs one or more bi-term topic modeling operations based on the command logs 126 included in the artifact database 120 to generate the task model 140 and the task distributions 150 included in the artifact database 120. The task model 140 is a type of trained machine-learning model. More precisely, the task model 140 is a type of topic model. As persons skilled in the art will recognize, a typical topic model is a statistical model that infers abstract "topics" and associated topic distributions for documents. By contrast, the task model 140 is a topic model in which topics are replaced with tasks 142 and documents are replaced with command logs 126.

During the training phase, the task model 140 infers any number of tasks 142 and the task distributions 150 based on the command logs 126 included in the artifact database 120. Each task 142 is an abstract representation of a type of work that is accomplished, at least in part, via one or more workflows. The task distribution 150(x) is a distribution of weights applied to a set of the tasks 142 for the command log 126(x). The task distribution 150 includes, without limitation, a different task weight (not shown) for each of the tasks 142. Further, the task 142 having the highest task weight is referred to herein as the "primary task 142" of the task distribution 150.

For example, suppose that the task model 140 were to infer twenty-five tasks 142 representing rendering, beginning sketching, and advanced surface modeling, to name a few, from the command logs 126 associated with 20,000 artifacts 122. If the sequence of commands included in the command log 126(11,332) were "center rectangle, create sketch, sketch dimension, edit sketch dimension," then the task model 140 would generate the task distribution 150(11, 332) specifying 1 for the task 142 representing beginning sketching and 0 for the other twenty-four tasks 142.

The training engine 130 trains the task model 140 to infer the tasks 142 based on modeling word co-occurrence patterns (i.e., bi-terms) in the command logs 126 included in the artifact database 120. The training engine 130 may implement any number and type of bi-term topic modeling techniques to train the task model 140. In general, the task model 140 maps the command log 126(x) to the task distribution 150(x). During the training phase, for each artifact 122(x), the training engine 130 generates the task distribution 150(x) based on the command log 126(x) and the task model 140. After the task model 140 is trained, the training engine 130 stores the task distributions 150(1)-150 (N) in the artifact database 120. For explanatory purposes only, the primary task 142 of the task distribution 150(x) included in the artifact database 120 is also referred to herein as the primary task 142 of the artifact 122(x). The training engine 130 then stores the task model 140 in memory 116 accessible to the task-based recommendation subsystem 160.

During a subsequent recommendation phase, the task-based recommendation subsystem 160 generates a recommendation list 180 for the target user 162 based on the task model 140, the artifact database 120, the user database 170, and a target interest 164. The user database 170 includes, without limitation, any number of user IDs 172(1)-172(M) and log datasets 174(1)-174(M). Each of the user IDs 172 specifies a unique user in any technically feasible fashion. For instance, in some embodiments, the user IDs 172 may be login names. The log dataset 174(u) is associated with the user ID 172(u) and includes, without limitation, any number of command logs 126, where each of the command logs 126 is associated with a different discrete portion of work referred to herein as a "session." The number of command logs 126 included in one log dataset 174 may differ from the number of command logs 126 included in another log dataset 174.

For explanatory purposes only, for objects that are associated with either the user ID 172 or the task 142, the parenthetical numbers or characters may be followed by an apostrophe to clarify that a particular instance is associated with the user ID 172 and not associated with the task 142. For instance, the log dataset 174(1) is associated with the user ID 172(1) and includes, without limitation, the command logs 126(1')-126(P'). Using this nomenclature, the task model 140 maps the command log 126(u') associated with a particular user ID 172 to the task distribution 150(u') associated with the user ID 172.

The target user 162 specifies one of the user IDs 172. The target interest 164 is either "familiar" or "unfamiliar." If the target interest 164 is familiar, then the target user 162 is interested in automating tasks 142 that are similar to the tasks 142 that the target user 162 commonly performs. By contrast, if the target interest 164 is unfamiliar, then the target user 162 is interested in automating tasks 142 that are dissimilar to the tasks 142 that the target user 162 commonly performs, but are likely to be relevant to the target user 162.

For example, suppose that the primary task 142 of the target user 162 is to design chairs. If the target interest 164 is familiar, then the target user 162 is interested in improving workflows for tasks familiar to the target user 162, such as designing chairs. If, however, the target interest 164 is unfamiliar, then the target user 162 is interested in creating workflows for tasks that are unfamiliar to the user, such as designing coffee tables. The target user 162 and the target interest 164 may be specified in any technically feasible fashion. For instance, in some embodiments, the target user 162 and the target interest 164 may be specified via a graphical user interface (GUI), not shown.

As shown, the task-based recommendation subsystem 160 includes, without limitation, the familiar task optimizer 192 and the unfamiliar task optimizer 194. During the recommendation phase, if the target interest 164 is equal to familiar, then the task-based recommendation subsystem 160 executes the familiar task optimizer 192 to generate the recommendation list 180. Otherwise, the task-based recommendation subsystem 160 executes the unfamiliar task optimizer 194 to generate the recommendation list 180.

In operation, the familiar task optimizer 192 maps each of the command logs 126($u'$) associated with the target user 162 to a different task distribution 150($u'$) associated with the target user 162. The familiar task optimizer 192 then averages the task distributions 150 associated with the target user 162 to generate a target task distribution (not shown in FIG. 1). The familiar task optimizer 192 sets a target task (not shown in FIG. 1) equal to the primary task 142 of the target task distribution.

By contrast, the unfamiliar task optimizer 194 maps each of the command logs 126($u'$) included in the user database 170 to a different task distribution 150($u'$) via the task model 140. For each user ID 172, the unfamiliar task optimizer 194 averages the associated task distributions 150 to generate an average task distribution (not shown) associated with the user ID 172. The unfamiliar task optimizer 194 sets the target task distribution equal to the average task distribution associated with the target user 162. The unfamiliar task optimizer 194 then selects the average task distributions that are similar to the target task distribution based on a user similarity threshold (not shown in FIG. 1). Subsequently, the unfamiliar task optimizer 194 sets the target task equal to the task 142 having the largest difference between the task distribution weights of the selected average task distributions and the target task distribution.

Although not shown in FIG. 1, each of the familiar task optimizer 192 and the unfamiliar task optimizer 194 includes a different instance of a task-based artifact selector. After the familiar task optimizer 192 or the unfamiliar task optimizer 194 determines the target task and the target task distribution, the task-based artifact selector generates the recommendation list 180. First, the task-based artifact selector generates a matching artifact list (not shown in FIG. 1) based on the target task and the task distributions 150 included in the artifact database 120. The matching artifact list specifies the artifacts 122 having a primary task 142 equal to the target task. As described in greater detail in conjunction with FIG. 2, the task-based artifact selector then performs any number and type of filtering, ranking, and selection operations on the matching artifact list based on the target task distribution and the artifact database 120 to generate the recommendation list 180.

The recommendation list 180 specifies any number of recommendations 182, where each recommendation 182 specifies a different one of the artifacts 122. Each of the recommendations 182 reflects the target user 162 and the target interest 164. More precisely, each of the recommendations 182 specifies one of the artifacts 122 that demonstrates how to automate a task 142 that is aligned with the interests of the target user 162. Subsequently, a new workflow is generated or an existing workflow is improved based on the one or more of the artifacts 122 specified in the recommendation list 180.

Advantageously, because the task-based recommendation subsystem 160 generates the recommendation list 180 based on comparing tasks 142 instead of individual commands, the likelihood that the recommendations 182 conform to the interests of the target user 162 is increased compared to prior art command-based recommendations. Further, unlike prior art command-based recommendations, each of the recommendations 182 may provide information on unfamiliar ways to use familiar commands.

Note that the techniques described herein are illustrative rather than restrictive, and may be altered without departing from the broader spirit and scope of the invention. Many modifications and variations on the functionality provided by the training engine 130, the task model 140, the task-based recommendation subsystem 160, the familiar task optimizer 192, and the unfamiliar task optimizer 194 will be apparent to those of ordinary skill in the art without departing from the scope and spirit of the described embodiments. As a general matter, the techniques outlined herein are applicable to automating tasks based on recommendations of artifacts 122, where the recommendations are generated using a task model 140 that maps the command log 126 to the task distribution 150.

It will be appreciated that the system 100 shown herein is illustrative and that variations and modifications are possible. For example the functionality provided by the training engine 130, the task model 140, the task-based recommendation subsystem 160, the familiar task optimizer 192, and the unfamiliar task optimizer 194 as described herein may be integrated into or distributed across any number of software applications (including one), and any number of components of the system 100. Further, the connection topology between the various units in FIG. 1 may be modified as desired.

Figure 2:
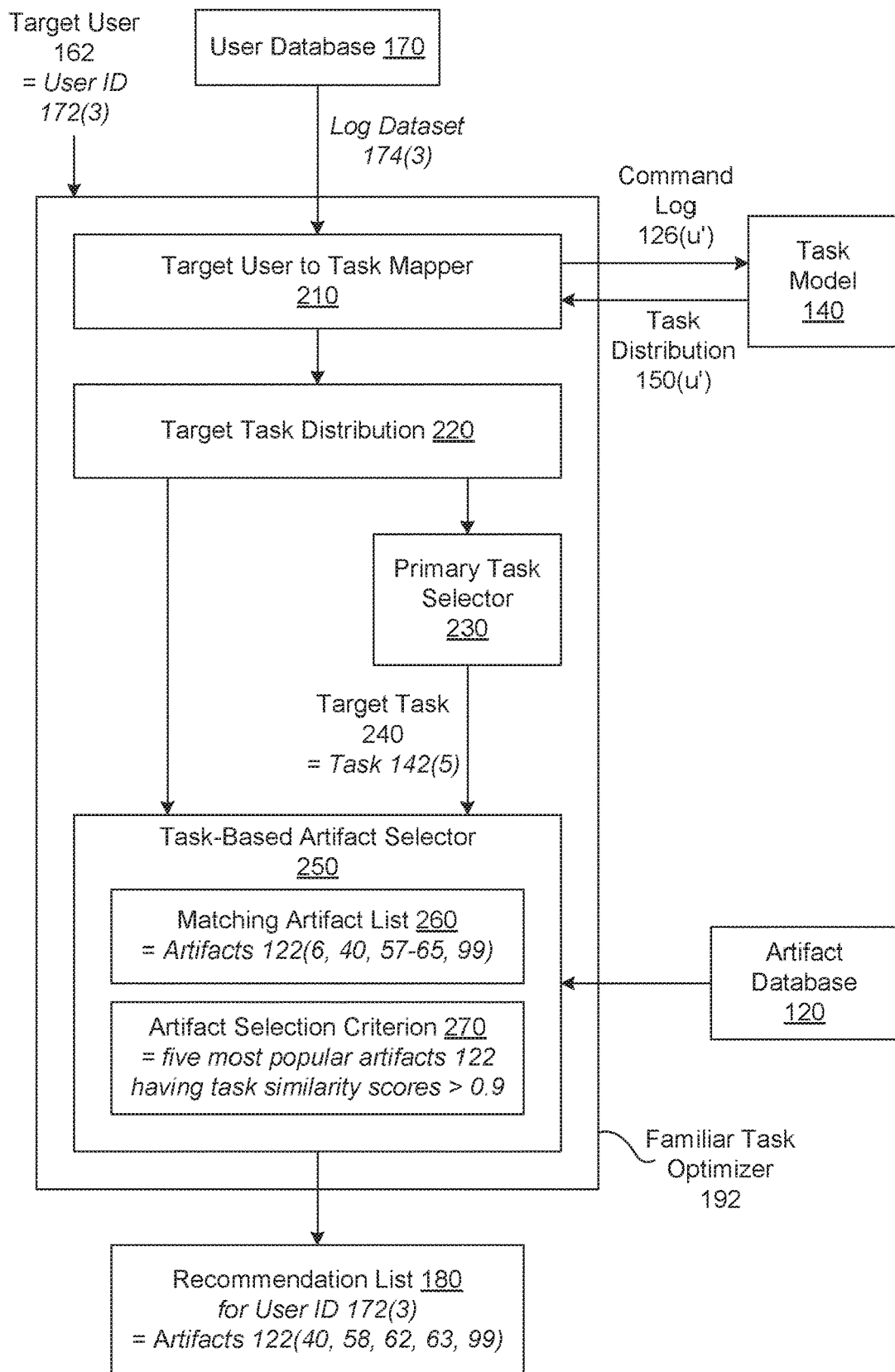
FIG. 2 is a more detailed illustration of the familiar task optimizer of FIG. 1, according to various embodiments of the present invention.

FIG. 2 is a more detailed illustration of the familiar task optimizer 192 of FIG. 1, according to various embodiments of the present invention. As shown, the familiar task optimizer 192 includes, without limitation, the target user to task mapper 210, the target task distribution 220, the primary task selector 230, and the task-based artifact selector 250. In general, the familiar task optimizer 192 generates the recommendation list 180 based on the primary task 142 of the target user 162.

The target user to task mapper 210 generates the target task distribution 220 based on the log dataset 174 associated with the target user 162 and the task model 140. In operation, for each of the command logs 126($u'$) included in the log dataset 174, the target user to task mapper 210 generates the task distribution 150($u'$) based on the task model 140. For each of the tasks 142, the target user to task mapper 210 then averages the associated task weights included in the resulting task distributions 150 to generate an associated task weight included the target task distribution 220.

Accordingly, the target task distribution 162 is a per-task average of the task distributions 150 associated with the target user 162.

Subsequently, the primary task selector 230 sets a target task 240 equal to the primary task 142 associated with the target task distribution 162. More specifically, the primary task selector 230 compares the task weights included in the target task distribution 162 to determine the highest task weight. The primary task selector 230 then sets the target task 240 equal the task 142 having the highest task weight. Because the target task distribution 162 is associated with the target user 162, the target task 240 is the primary task 142 of the target user 162.

As shown, the task-based artifact selector 250 generates the recommendation list 180 based on the target task 240, the target task distribution 220, and the artifact database 120. First, the task-based artifact selector 250 generates a matching artifact list 260 based on the target task 240 and the task distributions 150 included in the artifact database 120. For each of the artifacts 122, if the primary task 142 of the artifact 122 is equal to the target task 240, then the task-based artifact selector 250 adds the artifact 122 to the matching artifact list 260. Otherwise, the task-based artifact selector 250 omits the artifact 122 from the matching artifact list 260.

The task-based artifact selector 250 generates the recommendation list 180 based on the matching artifact list 260, the target task distribution 220, the artifact database 120, and an artifact selection criterion 270. In general, the artifact selection criterion 270 determines which of the artifacts 122 included in the matching artifact list 260 are specified as recommendations 182 included in the recommendation list 180. The artifact selection criterion 270 may be specified in any technically feasible fashion.

In some embodiments, the artifact selection criterion 270 specifies a similarity threshold and a total number of recommendations 182. To comply with the artifact selection criterion 270, the task-based artifact selector 250 first computes a similarity score for each of the artifacts 122 included in the matching artifact list 260. The similarity score for the artifact $122(x)$ is the cosine similarity between the task distribution $150(x)$ associated with the artifact $122(x)$ and the target task distribution 220. In alternate embodiments, the task-based artifact selector 250 may compute the cosine similarity in any technically feasible fashion. In other alternate embodiments, the task-based artifact selector 250 may compute the similarity score based on any type of similarity metric instead of the cosine similarity.

For each of the artifacts 122 included in the matching artifact list 260, if the similarity score exceeds the similarity threshold, then the task-based artifact selector 250 selects the artifact 122. Otherwise, the task-based artifact selector 250 disregards the artifact 122. The task-based artifact selector 250 then ranks the selected artifacts 122 based on the associated popularity scores 124 to generate a ranked list. Subsequently, the task-based artifact selector 250 generates the recommendations 182(1)-182(P) specifying the P highest ranked artifacts 122 included in the ranked list, where P is the total number of recommendations 182 specified in the artifact selection criterion 270. The task-based artifact selector 250 then generates the recommendation list 180 that includes, without limitation, the recommendations 182(1)-182(P).

The task-based artifact selector 250 may acquire the artifact selection criterion 270 in any technically feasible fashion. For instance, in some embodiments, the task-based artifact selector 250 determines the artifact selection criterion 270 based on user input received via a graphical user interface (GUI). In alternate embodiments, the task-based artifact selector 250 may generate the recommendation list 180 based on any number and type of criteria and any amount and type of characteristics associated with the artifacts 122 included in the matching artifact list 260 in any technically feasible fashion.

For explanatory purposes only, FIG. 2 depicts exemplary values for the target user 162, the target task 240, the matching artifact list 260, the artifact selection criterion 270, and the recommendation list 180 in italics. As shown, the target user 162 is equal to the user ID 172(3). Consequently, the target user to task mapper 210 generates the target task distribution 220 based on the log dataset 174(3) and the task model 140. After determining that the task 142(5) is associated with the highest task weight included in the target task distribution 220, the primary task selector 230 sets the target task 240 equal to the task 142(5). The task-based artifact selector 250 generates the matching artifact list 260 that includes, without limitation, the artifacts 122(6), 122(40), 122(57-65), and 122(99) for which the task 142(5) is the primary task 142. Finally, the task-based artifact selector 250 generates the recommendation list 180 that includes, without limitation, the five most popular artifacts 122 from the matching artifact list 260 having similarity scores greater than 0.9: the artifacts 122(40), 122(58), 122(62), 122(63), and 122(99).

Figure 3:
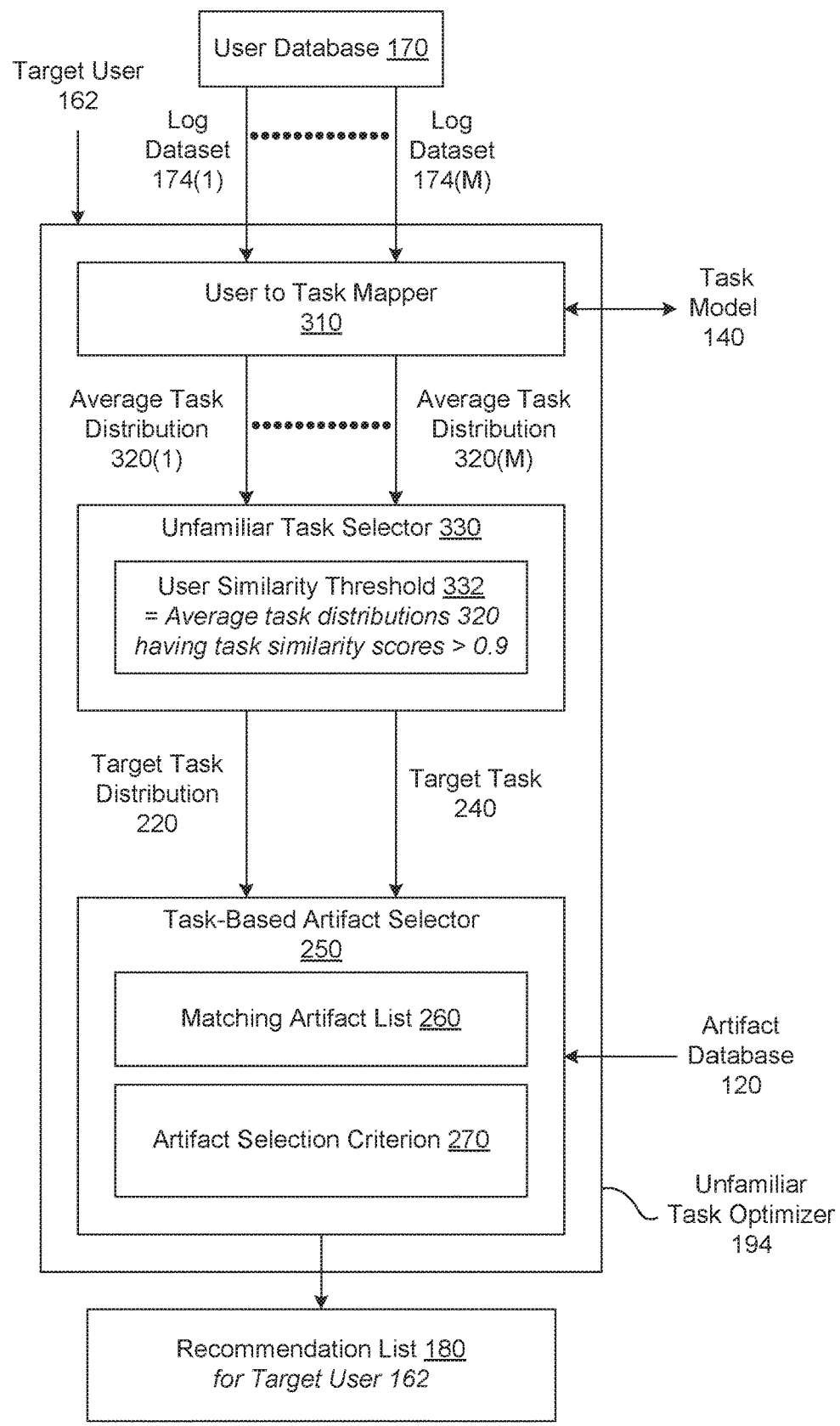
FIG. 3 is a more detailed illustration of the unfamiliar task optimizer of FIG. 1, according to various embodiments of the present invention.

FIG. 3 is a more detailed illustration of the unfamiliar task optimizer 194 of FIG. 1, according to various embodiments of the present invention. As shown, the unfamiliar task optimizer 194 includes, without limitation, a user to task mapper 310, an unfamiliar task selector 330, and the task-based artifact selector 250. In general, the unfamiliar task optimizer 194 generates the recommendation list 180 based on one of the tasks 142 that is not the primary task 142 of the target user 162.

For each user ID $172(x)$ included in the user database 170, the user to task mapper 310 generates an average task distribution $320(x)$ based on the log dataset $174(x)$ and the task model 140. To generate the average task distribution $320(x)$, for each of the command logs $126(u')$ included in the log dataset $174(x)$, the user to task mapper 310 generates the task distribution $150(u')$ based on the task model 140. For each of the tasks 142, the user to task mapper 310 then averages the associated task weights included in the resulting task distributions 150 to generate an associated task weight included the average task distribution $320(x)$. Accordingly, the average task distribution $320(x)$ is a per-task average of the task distributions 150 associated with the user ID $172(x)$. The user to task mapper 310 sets the target task distribution 220 equal to the average task distribution $320(x)$ associated with the target user 162.

As shown, the unfamiliar task selector 330 determines the target task 240 based on the average task distributions 320 and a user similarity threshold 332. First, the unfamiliar task selector 330 computes a similarity score for each of the average task distributions 320. The similarity score for the average task distribution $320(x)$ is the cosine similarity between the average task distribution $320(x)$ and the target task distribution 220. The unfamiliar task selector 330 may compute the cosine similarity in any technically feasible fashion. In alternate embodiments, the unfamiliar task selector may compute the similarity scores based on any type of similarity metric instead of the cosine similarity.

If the similarity score for the average task distribution $320(x)$ exceeds the user similarity threshold 332, then the unfamiliar task selector 330 adds the average task distribution 320(x) to a similar distribution list (not shown). Otherwise, the unfamiliar task selector 330 omits the average task distribution 320 from the similar distribution list. The unfamiliar task selector 330 may determine the similarity threshold 332 in any technically feasible fashion. For instance, in some embodiments, the unfamiliar task detector 330 may determine the similarity threshold 332 based on user input received via a GUI.

For each task 142, the unfamiliar task optimizer 194 then computes a task weight difference between the average task distributions 320 included in the similar distribution list and the target task distribution 220. For example, to compute the task weight difference associated with the first task 142(1), the unfamiliar task optimizer 194 sets a similar task weight equal to the average of the first task weights included in the average task distributions 320 included in the similar distribution list. The unfamiliar task optimizer 194 then subtracts the first task weight included in the target task distribution 220 from the similar task weight to determine the task weight difference. Finally, the unfamiliar task optimizer 194 sets the target task 240 equal to the task 142 associated with the highest task weight difference.

As described in detail previously in conjunction with FIG. 2, the task-based artifact selector 250 generates the recommendation list 180 based on the target task 240, the target task distribution 220, and the artifact database 120. Notably, the target task 240 is relatively unfamiliar to the target user 162 and relatively familiar to at least one user that performs similar tasks 142 to the target user 162. Advantageously, because the target task 240 is relatively familiar to at least one "similar" user, the target task 240 is more likely to align with the interests of the target user 162 than a task 142 that is relatively unfamiliar to the target user 162 and the similar users.

Figure 4:
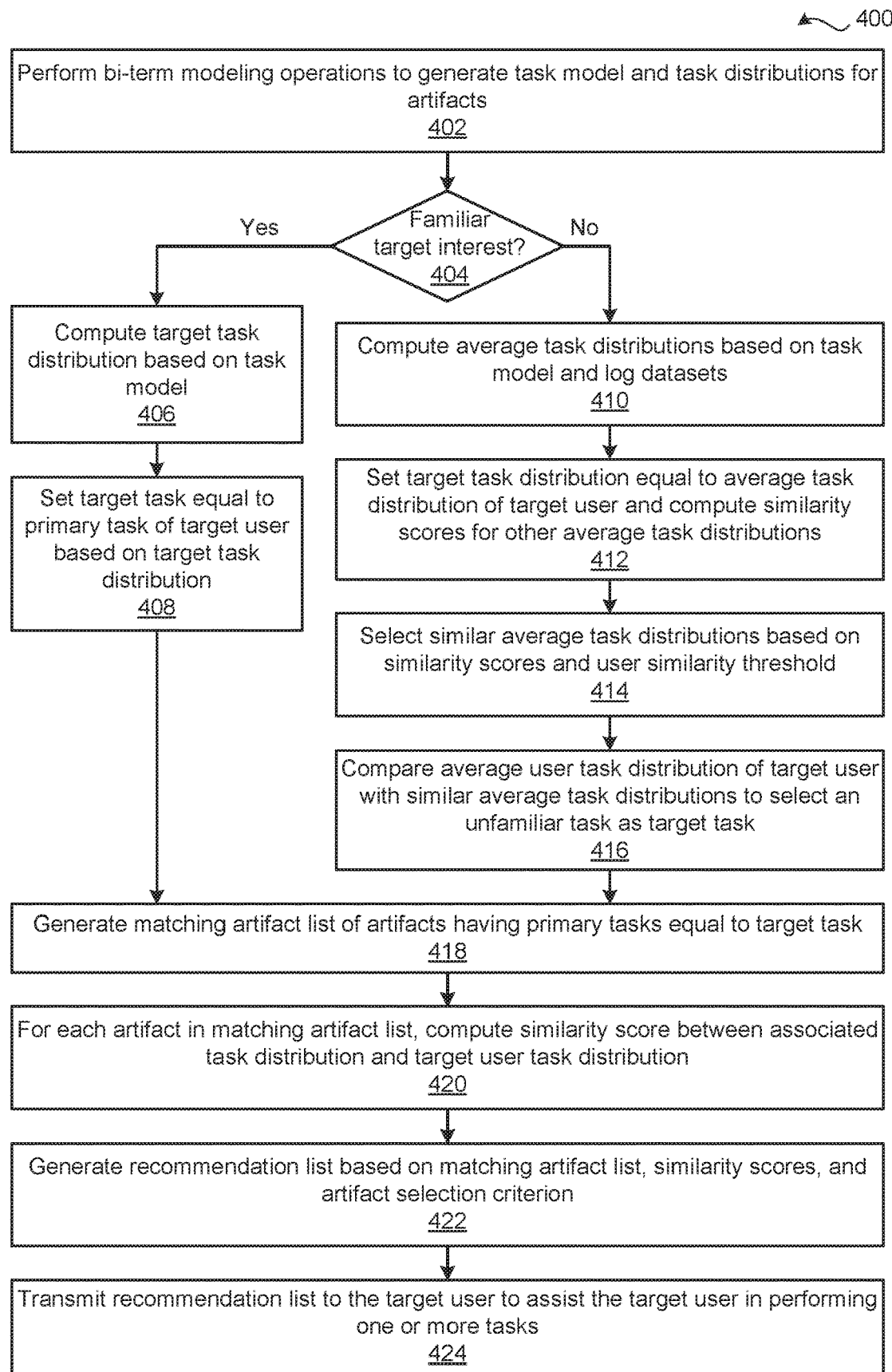
FIG. 4 is a flow diagram of method steps for automating software-based tasks, according to various embodiments of the present invention.

FIG. 4 is a flow diagram of method steps for automating software-based tasks, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the training engine 130 performs bi-term topic modeling operations on the command logs 126 associated with the artifacts 122 to generate the task model 140 and the task distributions 150 associated with the artifacts 122. At step 404, the task-based recommendation subsystem 160 determines whether the target user 162 is more interested in automating familiar tasks or unfamiliar tasks. The task-based recommendation subsystem 160 may determine whether the target user 162 is more interested in automating familiar tasks or unfamiliar tasks in any technically feasible fashion. For instance, in some embodiments, the task-based recommendation subsystem 160 determines whether the target user 162 is more interested in automating familiar tasks or unfamiliar tasks based on the setting of a user-configurable target interest 164.

If, at step 404, the task-based recommendation subsystem 160 determines that the target user 162 is more interested in automating familiar tasks than automating unfamiliar tasks, then the method 400 proceeds to step 406. At step 406, the target user to task mapper 210 generates the target task distribution 220 based on the task model 140 and the log dataset 174 associated with the target user 162. At step 408, the primary task selector 230 sets the target task 240 equal to the primary task 142 of the target user 162 based on the target task distribution 220. The method 400 then proceeds directly to step 418.

If, however, at step 404, the task-based recommendation subsystem 160 determines that the target user 162 is more interested in automating unfamiliar tasks than automating familiar tasks, then the method 400 proceeds directly to step 410. At step 410, the user to task mapper 310 generates the average task distributions 320(1)-320(M) based on the task model 140 and, respectively, the log datasets 174(1)-174(M). At step 412, the unfamiliar task selector 330 sets the target task distribution 220 equal to the average task distribution 320 of the target user 162 and then computes the similarity score between each of the other average task distributions 320 and the target task distribution 220.

At step 414, the unfamiliar task selector 330 selects any number of similar average task distributions 320 based on the similarity scores and the user similarity threshold 332. At step 416, the unfamiliar task selector 330 compares the selected similar average task distributions 320 to the target task distribution 220 to determine the target task 240. More precisely, the unfamiliar task selector 330 sets the target task 240 equal to the task associated with the highest task weight difference between the selected similar average task distributions 320 and the target task distribution 220.

At step 418, the task-based artifact selector 250 generates the matching artifact list 260 that includes the artifacts 122 having primary tasks 142 that equal the target task 240. At step 420, for each of the artifacts 122(x) included in the matching artifact list 260, the task-based artifact selector 250 computes a different similarity score between the associated task distribution 150(x) and the target task distribution 220. At step 422, the task-based artifact selector 250 generates the recommendation list 180 based on the similarity scores, the matching artifact list 260 and the artifact selection criterion 270. At step 424, the task-based artifact selector 250 transmits the recommendation list 180 to the target user 162 to assist the target user 162 in performing one or more tasks. The method 400 then terminates.

Automatically Recommending Workflows Based on Patterns of Commands

In alternate embodiments, the system 100 is replaced with a hierarchical system. As previously described in conjunction with FIGS. 1-4B, the task-based recommendation subsystem 160 included in the system 100 generates the recommendation list 180 based on classifying commands at the granularity of tasks 142. Accordingly, the artifacts 122 specified in the recommendation list 180 generated by the task-based recommendation subsystem 160 target a general task 142, such as sketching. By contrast, as described in conjunction with FIG. 5-7B, a pattern-based recommendation subsystem included in the hierarchical system generates the recommendation list 180 based on classifying commands at the granularity of patterns. Each pattern specifies any number of commands that frequently appear in association with at least one of the tasks 142. Accordingly, the artifacts 122 specified in the recommendation list 180 generated by the pattern-based recommendation subsystem target specific patterns of commands, such as drawing a line, applying a constraint, and editing dimensions.

Figure 5:
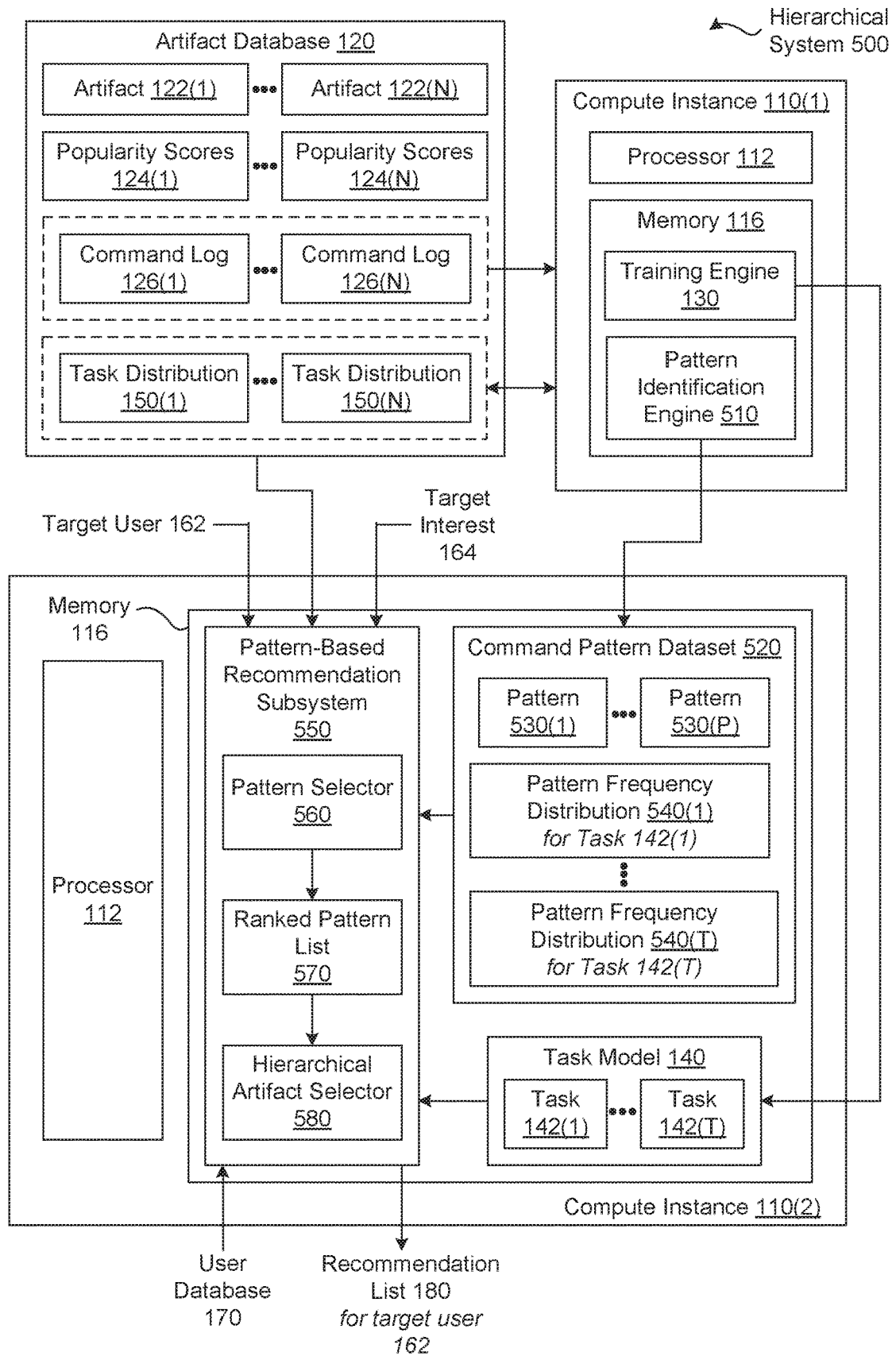
FIG. 5 is a conceptual illustration of a hierarchical system configured to implement one or more other aspects of the present invention.

FIG. 5 is a conceptual illustration of a hierarchical system 500 configured to implement one or more other aspects of the present invention. As shown, the hierarchical system 500 includes, without limitation, two compute instances 110, the artifact database 120, and the user database 170. In alternate embodiments, the hierarchical system 500 may include any number of compute instances 110 and any number and type of databases, in any combination.

Any number of the components of the hierarchical system 500 may be distributed across multiple geographic locations. Further, any number of the components of the hierarchical system 500 may be included in or distributed across one or more stand-alone devices, distributed computing environments, or cloud computing environments (i.e., encapsulated shared resources, software, data, etc.) in any combination.

In a training phase and as previously described in conjunction with FIG. 1, the training engine 130 that resides in the memory 116 and executes on the processor 112 of the compute instance 110(1) generates the task model 140 based on the command logs 126 included in the artifact database 120. And, for each of the artifacts 122(x) included in the artifact database 120, the training engine 130 generates the task distribution 150(x) based on the command log 126(x) and the task model 140. The training engine 130 stores the task distributions 150 in the artifact database 120 and the task model 140 in the memory 116 of the compute instance 110(2).

Subsequently, while still in the training phase, a pattern identification engine 510 that resides in the memory 116 and executes on the processor 112 of the compute instance 110(1) generates a command pattern dataset 520 based on the artifact database 120. More precisely, the pattern identification engine 510 generates the command pattern dataset 520 based on the task distributions 150 generated by the training engine 130 and included in the artifact database 120 and the command logs 126 included in the artifact database.

First, the pattern identification engine 510 assigns each of the artifacts 122(x) to the primary task 142 of the associated task distribution 150(x). As described previously herein, the primary task 142 of the task distribution 150(x) is the task 142 having the highest task weight in the task distribution 150(x). For each of the tasks 142(x), the pattern identification engine 510 performs frequent pattern mining operations on the command logs 126 of the artifacts 122 assigned to the task 142(x) to identify any number of patterns 530 and compute a pattern frequency distribution 540(x). In general, the pattern frequency distribution 540 is a distribution of frequencies across a set of command patterns.

More precisely, each of the patterns 530 associated with the task 142(x) specifies a list of commands that frequently appear together in the command logs 126 associated with the task 142(x). For example, one of the patterns 530 associated with a "beginner sketching" task 142 could be {Center Rectangle, Create Sketch, Sketch Dimension, Edit Sketch Dimension}. The pattern frequency distribution 540(x) is associated with the task 142(x) and specifies a different frequency for each of one or more patterns 530 that are associated with the task 142(x). The pattern identification engine 510 may perform any number and type of frequent pattern mining operations and any number and type of ancillary operations associated with any number and type of frequent pattern mining algorithms in any technically feasible fashion.

For instance, in some embodiments, the pattern identification engine 510 performs pattern mining operations associated with a Frequent Pattern Growth (FP-Growth) algorithm on the command logs 126 associated with the task 142(x) to identify initial patterns associated with the task 142(x). The pattern identification engine 510 determines the total number of initial patterns to identify for the task 142(x) based on the number of artifacts 122 assigned to the task 142(x) and a pattern threshold (not shown). An example of a pattern threshold is 8% of the total number of artifacts 122 assigned to the task 142(x). After acquiring the initial patterns associated with the task 142(x), the pattern identification engine 510 sets a minimal pattern length and a cutout cohesion length and executes a ranking algorithm to generate the patterns 530 associated with the task 142(x) based on the initial patterns.

The pattern identification engine 510 may set the minimal pattern length and the cutout cohesion length in any technically feasible fashion that is consistent with the command logs 126. For example, the pattern identification engine 510 could set the minimal pattern length to 3 and the cohesion score to 2 based on a statistical analysis of the command logs 126. As persons skilled in the art will recognize, a minimal pattern length of 3 and a cohesion score of 2 allows 1 outlier for a pattern of 3 commands.

After generating the patterns 530 associated with the task 142(x), the pattern identification engine 510 generate the pattern frequency distribution 540(x). After generating all of the patterns 530 for all of the tasks 142, the pattern identification engine 510 generates the command pattern dataset 520. The command pattern dataset 520 includes, without limitation, the patterns 530 associated with the different tasks 142 and the pattern frequency distributions 540(1)-540(T) associated with, respectively, the tasks 142(1)-142(T). The pattern identification engine 510 then stores the command pattern dataset 520 in the memory 116 of the compute instance 110(2).

In alternate embodiments, the training engine 130 and the pattern identification engine 510 may store, respectively, the task model 140 and the command pattern dataset 520 in any memory accessible by a pattern-based recommendation subsystem 550 in any technically feasible fashion. In the same or other embodiments, the pattern-based recommendation subsystem 550 may acquire the task model 140 and the command pattern dataset 520 in any technically feasible fashion.

In a recommendation phase, the pattern-based recommendation subsystem 550 generates the recommendation list 180 based on the command pattern dataset 520, the task model 140, the target user 162, the target interest 164, the artifact database 120, and the user database 170. As shown, the pattern-based recommendation subsystem 550 includes, without limitation, a pattern selector 560, a ranked pattern list 570, and a hierarchical artifact selector 580.

Figure 6:
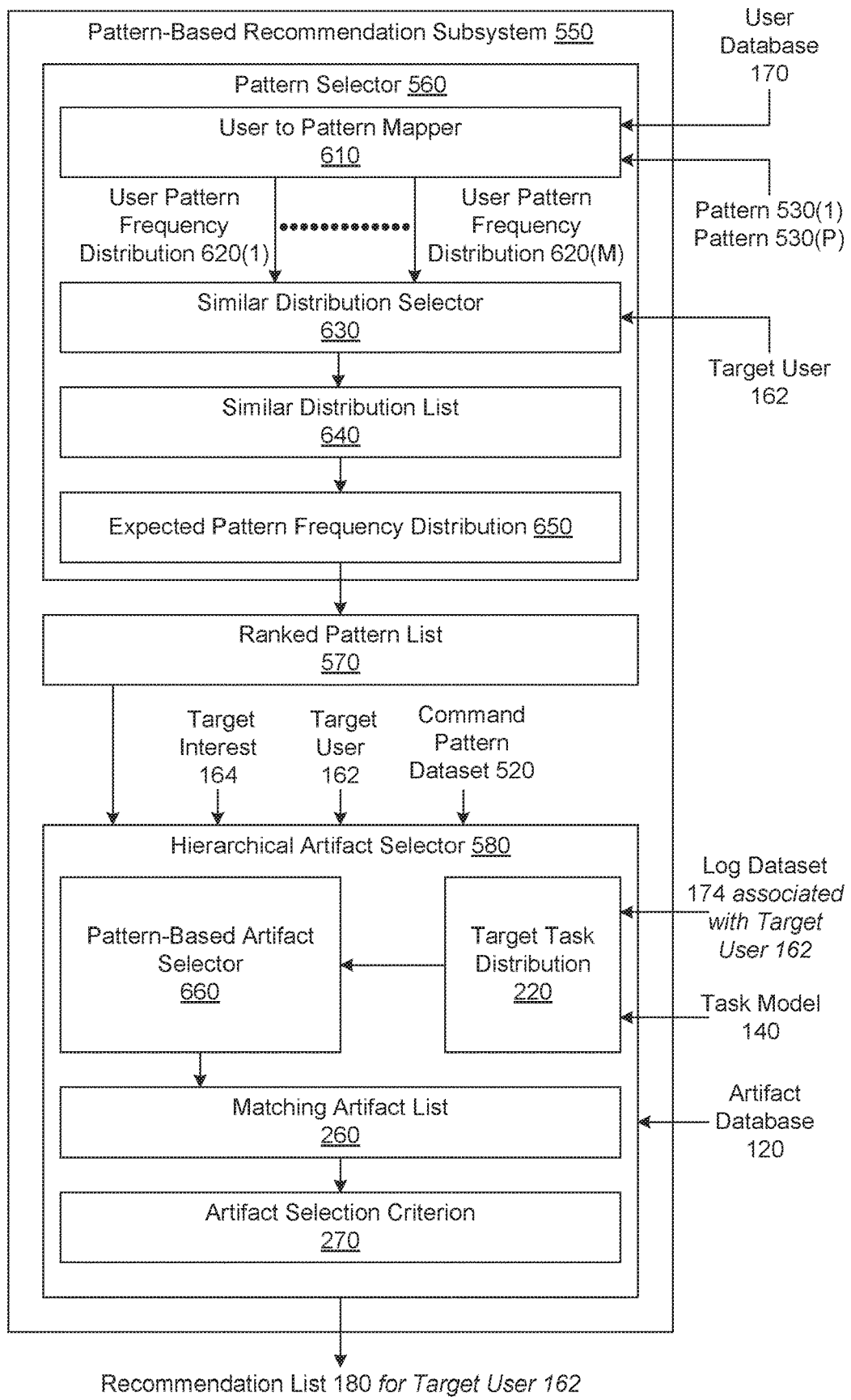
FIG. 6 is a more detailed illustration of the pattern-based recommendation subsystem of FIG. 5, according to various embodiments of the present invention.

As described in greater detail in conjunction with FIG. 6, the pattern selector 560 generates the ranked pattern list 570 based on the patterns 530, the log datasets 174, and the target user 162. For each of the user IDs 172(u), the pattern selector 560 generates a different user pattern frequency distribution based on the patterns 530 and the log dataset 174(u). The pattern selector 560 then generates a similar distribution list of user pattern frequency distributions that are similar to the user pattern frequency distribution of the target user 164. The pattern selector 560 computes an expected pattern frequency distribution based on the user pattern frequency distributions included in the similar distribution list. Finally, the pattern selector 560 generates the ranked pattern list 570 based on the expected pattern frequency distribution. The ranked pattern list 570 includes, without limitation, any number of patterns 530 that are not included in the log dataset 174 associated with the target user 162.

After receiving the ranked pattern list 570, the hierarchical artifact selector 580 generates the recommendation list 180. First, the hierarchical artifact selector 580 generates the target task distribution 220 based on the task model 140 and the log dataset 174 associated with the target user 162. The hierarchical artifact selector 580 then selects one or more of the patterns 530 included in the ranked pattern list 570 based on the target task distribution 220, the target interest 164, and the pattern frequency distributions 540.

If the target interest 164 is "familiar," then the hierarchical artifact selector 580 selects the highest ranked patterns 530 included in the ranked pattern list 750 that are associated with the tasks 142 frequently performed by the target user 162. If, however, the target interest 164 is "unfamiliar," then the hierarchical artifact selector 580 selects the highest ranked patterns 530 included in the ranked pattern list 570 that are not associated with the tasks 142 frequently performed by the target user 162.

For each of the selected patterns 530, the hierarchical artifact selector 580 adds the artifacts 122 having command logs 126 that include the selected pattern 530 to the matching artifact list 260. As described in greater detail in conjunction with FIG. 6, the hierarchical artifact selector 580 then performs any number and type of filtering, ranking, and selection operations on the matching artifact list 260 based on the target task distribution 220, the artifact selection criterion 270, and the artifact database 120 to generate the recommendation list 180.

Each of the recommendations 182 included in the recommendation list 180 specifies one of the artifacts 122 that demonstrates how to automate a task based on the patterns 530 that are associated with the interests of the target user 162. Subsequently, a new workflow is generated or an existing workflow is improved based on the one or more of the artifacts 122 specified in the recommendation list 180.

Advantageously, because the pattern-based recommendation subsystem 550 generates the recommendation list 180 based on comparing patterns 530 instead of individual commands, the likelihood that the recommendations 182 are applicable to tasks that the target user 162 performs is increased compared to prior art command-based recommendations. Further, unlike prior art command-based recommendations, each of the recommendations 182 may provide information on unfamiliar ways to use familiar commands.

Note that the techniques described herein are illustrative rather than restrictive, and may be altered without departing from the broader spirit and scope of the invention. Many modifications and variations on the functionality provided by the training engine 130, the task model 140, the pattern identification engine 510, the pattern-based recommendation subsystem 550, the pattern selector 560, and the hierarchical artifact selector 580 will be apparent to those of ordinary skill in the art without departing from the scope and spirit of the described embodiments. As a general matter, the techniques outlined herein are applicable to automating tasks based on recommendations 182 of artifacts 122, where the recommendations 182 are generated based on the task model 140 and pattern frequency distributions 540 associated with the different tasks 142.

It will be appreciated that the system 500 shown herein is illustrative and that variations and modifications are possible. For example the functionality provided by the training engine 130, the task model 140, the pattern identification engine 510, the pattern-based recommendation subsystem 550, the pattern selector 560, and the hierarchical artifact selector 580 as described herein may be integrated into or distributed across any number of software applications (including one), and any number of components of the system 100. Further, the connection topology between the various units in FIG. 5 may be modified as desired.

FIG. 6 is a more detailed illustration of the pattern-based recommendation subsystem 550 of FIG. 5, according to various embodiments of the present invention. As shown, the pattern-based recommendation subsystem 550 includes, without limitation, the pattern selector 560, the ranked pattern list 570, and the hierarchical artifact selector 580.

The pattern selector 560 includes, without limitation, a user to pattern mapper 610, a similar distribution selector 630, a similar distribution list 640, and an expected pattern frequency distribution 650. For each user ID $172(x)$ included in the user database 170, the user to pattern mapper 610 generates a user pattern frequency distribution $620(x)$ based on the log dataset $174(x)$ and the patterns 530 included in the command pattern dataset 520. Each of the patterns 530 included in the command pattern dataset 520 is associated with one or more tasks 142.

In particular, to generate the user pattern frequency distribution $620(x)$, the user to pattern mapper 610 generates the pattern frequency distribution $540(u')$ for each of the command logs $126(u')$ included in the log dataset $174(x)$. The user to pattern mapper 610 may execute any number and type of pattern matching operations in any technically feasible fashion to identify the frequency with which each of the patterns 530 occurs in the command log $126(u')$. Subsequently, for each of the user IDs $172(x)$, the user to pattern mapper 610 performs one or more summarizing operations on the associated pattern frequency distributions 540 to generate the user pattern frequency distribution $620(x)$. The user pattern frequency distribution $620(x)$ specifies a different summary frequency for each of the patterns 530 identified in the log dataset $174(x)$.

Upon receiving the user pattern frequency distributions 620, the similar distribution selector 630 computes similarity scores for each of the user IDs 172. The similar distribution selector 630 sets the similarity score for the user ID $172(x)$ equal to the cosine similarity between the user pattern frequency distribution $620(x)$ and the user pattern frequency distribution 620 of the target user 162. The similar distribution selector 630 may compute the cosine similarity in any technically feasible fashion. In alternate embodiments, the similar distribution selector 630 may compute the similarities scores based on any type of similarity metric in any technically feasible fashion.

Subsequently, the similar distribution selector 630 generates the similar distribution list 640 based on the similarities scores. After ranking the user pattern frequency distributions 620 based on the similarity scores, the similar distribution selector 630 adds any number of the most similar user pattern frequency distributions 620 to the similar distribution list 640. The similar distribution selector 630 may determine the total number of user pattern frequency distributions 620 to add to the similar distribution list 640 in any technically feasible fashion. In alternate embodiments, the similar distribution selector 630 may generate the similar distribution list 640 based on any number and type of criteria and any amount and type of characteristics associated with the user pattern frequency distributions 620, the patterns 530, and/or the user IDs 172 in any technically feasible fashion.

After the similar distribution selector 630 generates the similar distribution list 640, the pattern selector 560 generates the expected pattern frequency distribution 650. In general, the expected pattern frequency distribution 650 specifies a distribution across the patterns 530 that the target user 162 is expected to have based on the user pattern frequency distributions 620 included in the similar distribution list 640. The pattern selector 560 may generate the expected pattern frequency distribution 650 in any technically feasible fashion. For instance, in some embodiments, the pattern selector 560 computes the expected pattern frequency distribution 650 based on the following equation (1):

$$ef_{ij} = \sum_{k=1}^{n} w_{jk} pf_{ik} \qquad (1)$$

In equation (1), $ef_{ij}$ is the expected frequency for the pattern 530(i) and the user ID 172(j), $w_{jk}$ is the similarity score between the user pattern frequency distribution 620(j) and the user pattern frequency distribution 620(k), and $pf_{ik}$ is the frequency of the pattern 530(i) in the user pattern frequency distribution 620(k).

The pattern selector 560 modifies the expected pattern frequency distribution 650 to remove the patterns 530 that also occur in the log dataset 174 associated with the target user 162. The pattern selector 560 may identify the patterns 530 that occur in the log dataset 174 based on the log dataset 174 or based on the user pattern frequency distribution 620 associated with the target user 162. Subsequently, the pattern selector 560 ranks the remaining patterns 530 included in the expected pattern frequency distribution 650 based on the expected frequencies to generate the ranked pattern list 570.

The hierarchical artifact selector 580 includes, without limitation, the target task distribution 220, a pattern-based artifact selector 660, the matching artifact list 260, and the artifact selection criterion 270. The hierarchical artifact selector 580 generates the target task distribution 220 based on the task model 140 and the log dataset 174 associated with the target user 162. The pattern-based artifact selector 660 generates the matching artifact list 260 based on the ranked pattern list 570, the target task distribution 220, the target interest 164, and the command pattern dataset 520.

If the target interest 164 is equal to familiar, then the pattern-based artifact selector 660 selects one or more of the tasks 142 having the highest task weights (relative to the other tasks 142) included in the target task distribution 220. Otherwise, the pattern-based artifact selector 660 selects one or more of the tasks 142 having the lowest task weights (relative to the other tasks 142) included in the target task distribution 220. The pattern-based artifact selector 660 may determine the total number of tasks 142 to select in any technically feasible fashion.

Subsequently, the pattern-based artifact selector 660 removes the patterns from the ranked pattern list 570 that are not associated with the selected tasks 142 as per the pattern frequency distributions 540 included in the command pattern dataset 520. The pattern-based artifact selector 660 selects one or more of the highest ranked patterns 530 remaining in the ranked pattern list 570. The pattern-based artifact selector 660 may determine the total number of patterns 530 to select in any technically feasible fashion.

For each of the selected patterns 530, the hierarchical artifact selector 580 adds the artifacts 122 associated with command logs 126 that include the selected pattern 520 to the matching artifact list 260. Finally, the hierarchical artifact selector 580 generates the recommendation list 180 based on the matching artifact list 260 and the artifact selection criterion 270. The hierarchical artifact selector 580 may generate the recommendation list 180 in any technically feasible fashion based on the matching artifact list 260 any type of artifact selection criterion 270.

For instance, in some embodiments, the hierarchical artifact selector 580 implements techniques similar to the techniques implemented by the task-based artifact selector 250 described in detail previously herein in conjunction with FIG. 2. More specifically, the hierarchical artifact selector 580 selects the artifacts 122 included in the matching artifact list 260 having task distributions 150 that are relatively similar to the target task distribution 220 as per the artifact selection criterion 270. The hierarchical artifact selector 580 then ranks and/or filters the selected artifacts 122 as specified in the artifact selection criterion 270 to generate the recommendation list 180.

Figure 7A:
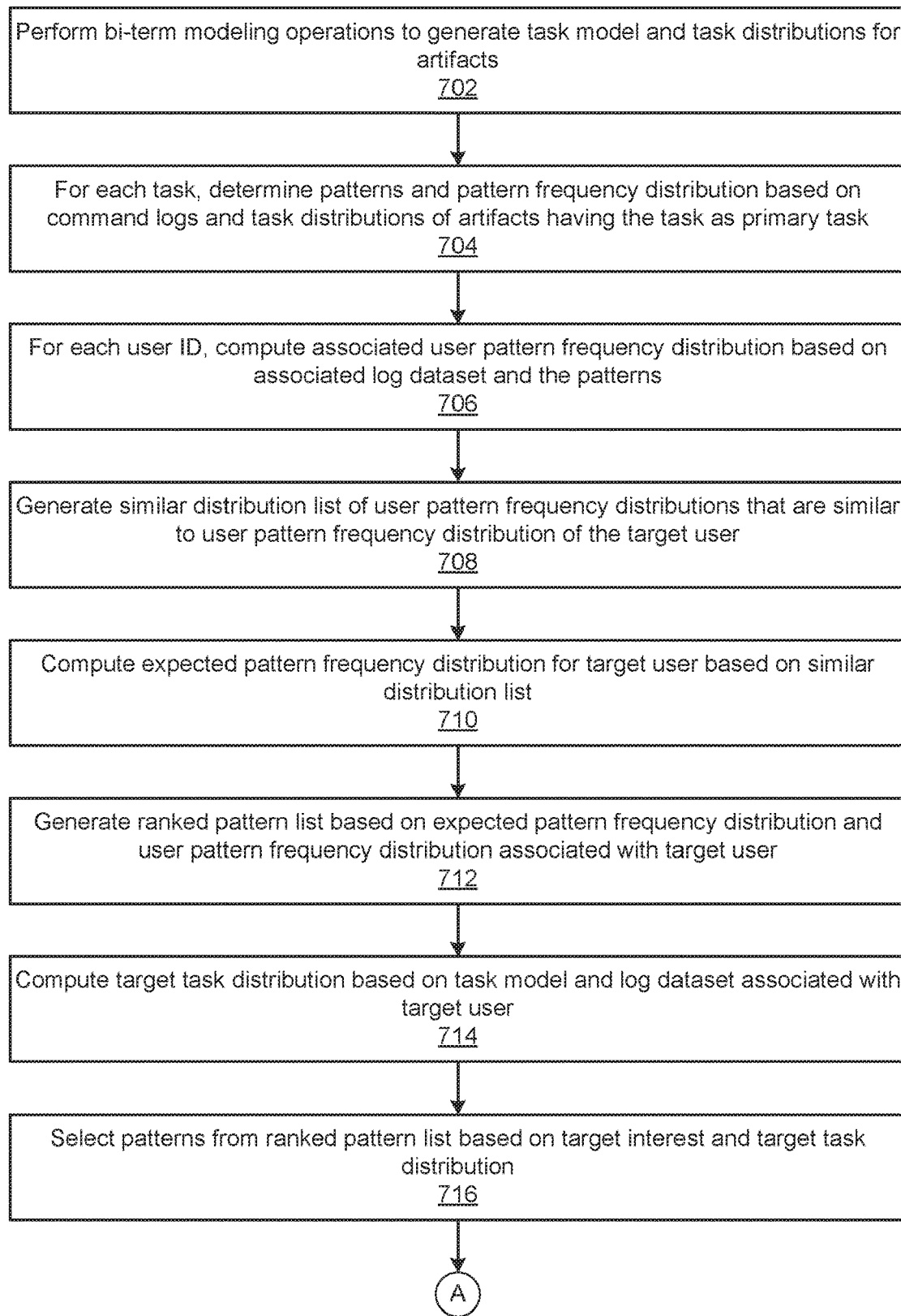
FIGS. 7A-7B set forth a flow diagram of method steps for automating software-based tasks, according to various embodiments of the present invention.
Figure 7B:
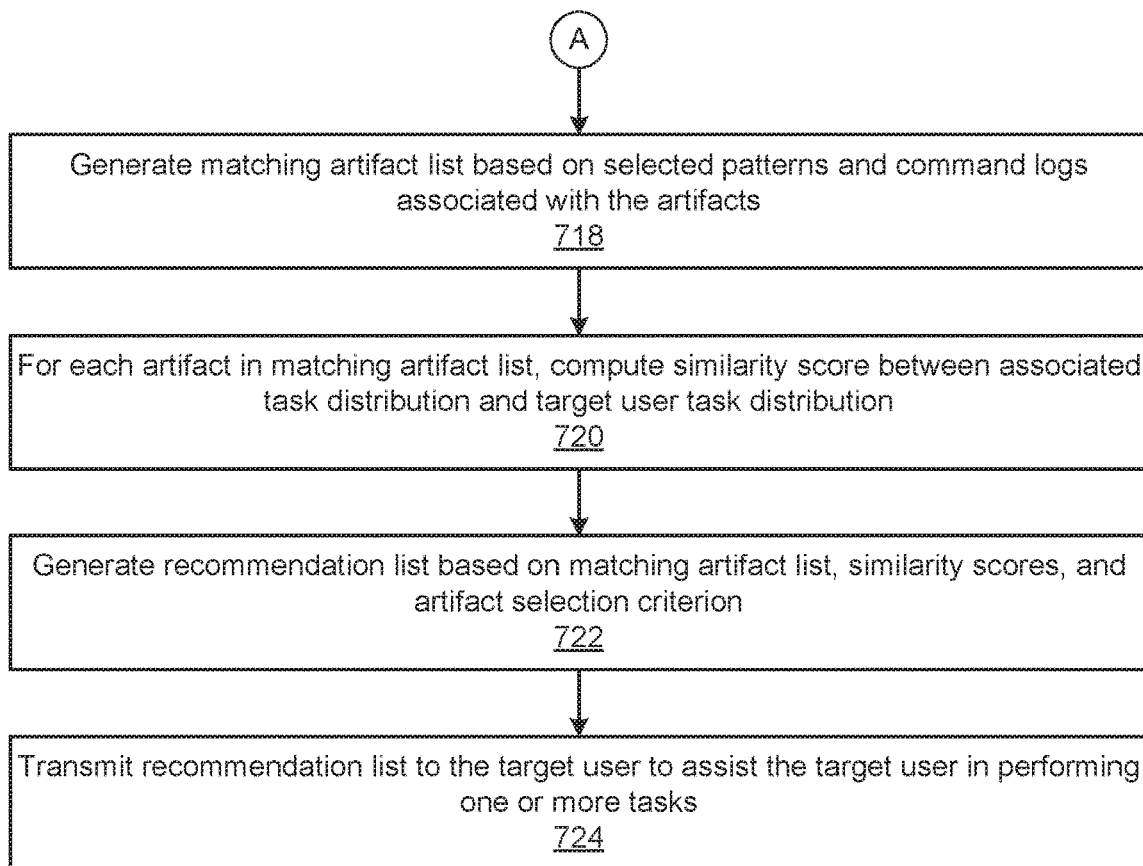

FIGS. 7A-7B set forth a flow diagram of method steps for automating software-based tasks, according to various embodiments of the present invention. Although the method steps are described with reference to the systems of FIGS. 1-3 and FIGS. 5-6, persons skilled in the art will understand that any system configured to implement the method steps, in any order, falls within the scope of the present invention.

As shown, a method 700 begins at step 702, where the training engine 130 performs bi-term topic modeling operations on the command logs 126 associated with the artifacts 122 to generate the task model 140 and the task distributions 150 associated with the artifacts 122. At step 704, for each of the tasks 142(x), the pattern identification engine 510 determines the patterns 530 and the pattern frequency distribution 540(x) based on the command logs 126 and the task distributions 150 of the artifacts 122 having the task 142(x) as the primary task 142. At step 706, for each of the user IDs 172(u), the user to pattern mapper 610 computes the user pattern frequency distribution 620(u) based on the log dataset 174(u) and the patterns 530 included in the command pattern dataset 520.

At step 708, the similar distribution selector 630 generates the similar distribution list 640 based on the user pattern frequency distributions 620 and the target user 162. The similar distribution list 640 includes, without limitation, any number of user pattern frequency distributions 620 that are similar to the user pattern frequency distribution 620 of the target user 162. At step 710, the pattern selector 560 computes the expected pattern frequency distribution 650 for the target user 162 based on the user pattern frequency distributions 620 included in the similar distribution list 640.

At step 712, the pattern-based recommendation subsystem 550 generates the ranked pattern list 570 based on the expected pattern frequency distribution 650 and the user pattern frequency distribution 620 of the target user 162. At step 714, the hierarchical artifact selector 580 generates the target task distribution 220 based on the task model 140 and the log dataset 174 associated with the target user 162. At step 716, the pattern-based artifact selector 660 selects one or more patterns 530 from the ranked pattern list 570 based on the target task distribution 220 and the target interest 164.

At step 718, the hierarchical artifact selector 580 generates the matching artifact list 260 based on the selected patterns 530 and the command logs 126 associated with the artifacts 122. At step 720, for each of the artifacts 122(x) included in the matching artifact list 260, the hierarchical artifact selector 580 computes a different similarity score between the associated task distribution 150(x) and the target task distribution 220. At step 722, the hierarchical artifact selector 580 generates the recommendation list 180 based on the similarity scores, the matching artifact list 260 and the artifact selection criterion 270. At step 724, the hierarchical artifact selector 580 transmits the recommendation list 180 to the target user 162 to assist the target user 162 in performing one or more tasks. The method 700 then terminates.

In sum, the disclosed techniques may be used to increase awareness of commands and command usage to enable more efficient task automation. In a training phase, a training engine performs bi-term topic modeling operations based on command logs included in an artifact database to infer tasks and generate a task model. The task model maps a command log to a task distribution. In general, each task distribution includes, without limitation, a different task weight for each inferred task and the task associated with the highest task weight is the primary task of the task distribution. As part of generating the task model, the training engine computes task distributions for each of the artifacts.

In some embodiments, in a subsequent recommendation phase, a task-based recommendation subsystem generates a recommendation list of artifacts for a target user based on the task model, command logs associated with user(s), the task distributions, and a target interest. If the target interest is "familiar," then the task-based recommendation subsystem generates a target task distribution based on the task model and command logs associated with the target user. Subsequently, the task-based recommendation subsystem selects all artifacts having the same primary task as the target user and task distributions similar to the target task distribution. Finally, the task-based recommendation subsystem ranks the selected artifacts based popularity to generate the recommendation list for the target user.

If, however, the target interest is "unfamiliar," then the task-based recommendation subsystem generates an average task distribution for each user based on the task model and command logs associated with the user. The task-based recommendation subsystem sets the target task distribution equal to the average task distribution associated with the target user. The task-based recommendation subsystem then identifies average target distributions that are similar to the target task distribution. The task-based recommendation subsystem sets the target task equal to the task associated with the largest task weight difference between the target task distribution and the task distributions associated with the identified users. Subsequently, the task-based recommendation subsystem selects all artifacts having a primary task equal to the target task and task distributions similar to the target task distribution. Finally, the task-based recommendation subsystem ranks the selected artifacts based popularity to generate the recommendation list for the target user.

In other embodiments, as part of the training phase, a pattern identification engine evaluates the command logs and task distributions associated with the different artifacts to determine patterns of commands that are associated with different tasks. For each task, the pattern identification engine generates a pattern frequency distribution that specifies the frequency with which each pattern is associated with the task. During a subsequent recommendation phase, a pattern-based recommendation subsystem generates a recommendation list for the target user based on the identified patterns, the pattern frequency distributions, the task model, user command logs, the task distributions, and the target interest.

First, the pattern-based recommendation subsystem generates a user pattern frequency distribution for each user based on the patterns identified by the pattern identification engine and the command logs associated with the user. The pattern-based recommendation subsystem then selects the user pattern frequency distributions that are similar to the user pattern frequency distribution of the target user. The pattern-based recommendation subsystem computes an expected pattern frequency distribution based on the selected user pattern frequency distributions, removes expected patterns that are commonly used by the target user, and ranks the remaining expected patterns by frequency.

If the target interest is "familiar," then the pattern-based recommendation subsystem selects the highest ranked expected patterns that are associated with tasks frequently performed by the target user. If, however, the target interest is "unfamiliar," then the pattern-based recommendation subsystem selects the highest ranked expected patterns that are associated with tasks that are not frequently performed by the target user. For each selected expected pattern, the pattern-based recommendation subsystem selects artifacts that are associated with the expected pattern and have task distributions that are similar to the target user task distribution. Finally, the task-based recommendation subsystem ranks the selected artifacts based on popularity to generate the recommendation list for the target user.

At least one improvement of the disclosed techniques relative to prior art is that recommendations are generated based on categorizing groups of commands (either tasks or patterns) instead of individual commands. Because commands are evaluated in the context of other commands, the likelihood that a recommendation conforms to the interests of the target user is increased compared to prior art command-based recommendations. Further, unlike prior art command-based recommendations, the recommendation may include artifacts that provide information on unfamiliar ways to use familiar commands. These technical advantages provide a substantial technological advancement over prior art solutions.

1. In some embodiments, a computer-implemented method for automatically recommending workflows for software-based tasks comprises computing an expected distribution of frequencies across a set of command patterns based on different distributions of frequencies across the set of command patterns, wherein the expected distribution of frequencies is associated with a target user, and each different distribution of frequencies is associated with a different user; applying a first set of commands associated with the target user to a trained machine-learning model to determine a target distribution of weights applied to a set of tasks, wherein the trained machine-learning model maps different sets of commands to different distributions of weights applied to the set of tasks; determining a first training item from a plurality of training items based on the expected distribution of frequencies and the target distribution of weights; generating a recommendation that specifies the first training item; and transmitting the recommendation to a user to assist the user in performing a particular task.

2. The method of clause 1, further comprising partitioning the plurality of training items across the set of tasks based on different distributions of weights applied to the set of tasks to generate a plurality of task sets; for each task set included in the plurality of task sets, performing one or more frequent pattern mining operations on at least one set of commands to generate a distribution of frequencies across a task-specific set of command patterns; and setting the set of command patterns equal to the union of the task-specific sets of command patterns.

3. The method of clause 1 or 2, further comprising generating a plurality of task-specific frequency distributions across different task-specific sets of command patterns based on different distributions of weights applied to the set of tasks, a Frequent Pattern Growth algorithm, and different sets of commands associated with the plurality of training items; and setting the set of command patterns equal to the union of the different task-specific sets of command patterns.

4. The method of any of clauses 1-3, further comprising performing one or more bi-term topic modeling operations based on a at least two sets of commands associated with the plurality of training items to generate the trained machine-learning model.

5. The method of any of clauses 1-4, wherein computing the expected distribution of frequencies comprises computing a plurality of similarity scores based on the different distributions of frequencies across the set of command patterns, wherein each similarity score is associated with both the target user and a different user included in a plurality of users; combining the different distributions of frequencies based on the similarity scores to generate the expected distribution of frequencies.

6. The method of any of clauses 1-5, wherein determining the first training item comprises determining a first command pattern from the set of command patterns based on the expected distribution of frequencies and a first distribution of frequencies across the across the set of command patterns that is associated with the target user; performing one or more filtering operations on the plurality of training items based on the first command pattern to determine a set of matching training items; and performing at least one of a ranking and a filtering operation on the set of matching training items based on the target distribution of weights to determine the first training item.

7. The method of any of clauses 1-6, wherein generating the recommendation comprises determining that a first popularity score associated with the first training item is greater than a second popularity score associated with a second training item; and adding the first training item but not the second training item to a list associated with the recommendation.

8. The method of any of clauses 1-7, wherein the first set of commands includes both a first command associated with a first software application and a second command associated with a second software application.

9. The method of any of clauses 1-8, wherein the first training item comprises a video, a document, a tutorial, or a website.

10. The method of any of clauses 1-9, wherein the particular task is included in the set of tasks.

11. In some embodiments, one or more non-transitory computer readable media include instructions that, when executed by one or more processors, cause the one or more processors to automatically recommend workflows for software-based tasks by performing the steps of computing an expected distribution of frequencies across a set of command patterns based on different distributions of frequencies across the set of command patterns, wherein the expected distribution of frequencies is associated with a target user, and each different distribution of frequencies is associated with a different user; applying a first set of commands associated with the target user to a trained machine-learning model to determine a target distribution of weights applied to a set of tasks, wherein the trained machine-learning model maps different sets of commands to different distributions of weights applied to the set of tasks; determining a first training item from a plurality of training items based on the expected distribution of frequencies and the target distribution of weights; generating a recommendation that specifies the first training item; and transmitting the recommendation to a user to assist the user in performing a particular task.

12. The one or more non-transitory computer readable media of clause 11, further comprising partitioning the plurality of training items across the set of tasks based on different distributions of weights applied to the set of tasks to generate a plurality of task sets; for each task set included in the plurality of task sets, performing one or more frequent pattern mining operations on at least one set of commands to generate a distribution of frequencies across a task-specific set of command patterns; and setting the set of command patterns equal to the union of the task-specific sets of command patterns.

13. The one or more non-transitory computer readable media of clause 11 or 12, further comprising determining the set of command patterns based on a Frequent Pattern Growth algorithm and at least two sets of commands, wherein each set of commands is associated with a different training item included in the plurality of training items.

14. The one or more non-transitory computer readable media of any of clauses 11-13, further comprising performing one or more topic modeling operations based on at least two sets of commands associated with the plurality of training items to generate the trained machine-learning model.

15. The one or more non-transitory computer readable media of any of clauses 11-14, wherein computing the expected distribution of frequencies comprises computing a plurality of similarity scores based on the different distributions of frequencies across the set of command patterns, wherein each similarity score is associated with both the target user and a different user included in a plurality of users; combining the different distributions of frequencies based on the similarity scores to generate the expected distribution of frequencies.

16. The one or more non-transitory computer readable media of any of clauses 11-15, wherein determining the first training item comprises determining a first command pattern from the set of command patterns based on the expected distribution of frequencies and a first distribution of frequencies across the across the set of command patterns that is associated with the target user; performing one or more filtering operations on the plurality of training items based on the first command pattern to determine a set of matching training items; and performing at least one of a ranking and a filtering operation on the set of matching training items based on the target distribution of weights to determine the first training item.

17. The one or more non-transitory computer readable media of any of clauses 11-16, wherein generating the recommendation comprises performing one or more ranking operations on the first training item and at least one other training item based on a popularity metric.

18. The one or more non-transitory computer readable media of any of clauses 11-17, wherein the first set of commands associated with the target user includes at least two subsets of commands, wherein each subset of commands is associated with a different session associated with a different discrete portion of work.

19. The one or more non-transitory computer readable media of any of clauses 11-18, wherein the particular task is not included in the set of tasks.

20. In some embodiments, a system comprises one or more memories storing instructions; and one or more processors that are coupled to the one or more memories and, when executing the instructions, are configured to compute an expected distribution of frequencies across a set of command patterns based on different distributions of frequencies across the set of command patterns, wherein the expected distribution of frequencies is associated with a target user, and each different distribution of frequencies is associated with a different user; apply a first set of commands associated with the target user to a trained machine-learning model to determine a target distribution of weights applied to a set of tasks, wherein the trained machine-learning model maps different sets of commands to different distributions of weights applied to the set of tasks; determine a first training item from a plurality of training items based on the expected distribution of frequencies and the target distribution of weights; generate a recommendation that specifies the first training item; and transmit the recommendation to a user to assist the user in performing a particular task.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically recommending workflows for software-based tasks, the method comprising:
   determining a set of command patterns associated with the software-based tasks, wherein each command pattern included in the set of command patterns comprises a plurality of commands associated with a different software-based task, and wherein determining the set of command patterns comprises computing at least a distribution of frequencies across one or more task-specific sets of command patterns;
   computing an expected distribution of frequencies across the set of command patterns based on different distributions of frequencies across the set of command patterns, wherein the expected distribution of frequencies is associated with a target user, and each different distribution of frequencies is associated with a different user;
   executing a trained machine-learning model on a first set of commands associated with the target user to generate a target distribution of weights applied to a set of tasks, wherein the trained machine-learning model maps different sets of commands to different distributions of weights applied to the set of tasks, wherein the trained machine learning model is generated using bi-term topic modeling operations based on at least two sets of commands;

determining a first training item from a plurality of training items based on the expected distribution of frequencies and the target distribution of weights;

generating a recommendation that specifies the first training item; and transmitting the recommendation to a user to assist the user in performing a particular task.

2. The method of claim 1, wherein determining the set of command patterns further comprises:

partitioning the plurality of training items across the set of tasks based on different distributions of weights applied to the set of tasks to generate a plurality of task sets;

for each task set included in the plurality of task sets, performing one or more frequent pattern mining operations on at least one set of commands to generate a distribution of frequencies across a task-specific set of command patterns; and setting the set of command patterns equal to the union of the task-specific sets of command patterns.

3. The method of claim 1, wherein determining the set of command patterns further comprises:

generating a plurality of task-specific frequency distributions across different task-specific sets of command patterns based on different distributions of weights applied to the set of tasks, a Frequent Pattern Growth algorithm, and different sets of commands associated with the plurality of training items; and setting the set of command patterns equal to the union of the different task-specific sets of command patterns.

4. The method of claim 1, further comprising performing one or more bi-term topic modeling operations based on a at least two sets of commands associated with the plurality of training items to generate the trained machine-learning model.

5. The method of claim 1, wherein computing the expected distribution of frequencies comprises:

computing a plurality of similarity scores based on the different distributions of frequencies across the set of command patterns, wherein each similarity score is associated with both the target user and a different user included in a plurality of users; and combining the different distributions of frequencies based on the plurality of similarity scores to generate the expected distribution of frequencies.

6. The method of claim 1, wherein determining the first training item comprises:

determining a first command pattern from the set of command patterns based on the expected distribution of frequencies and a first distribution of frequencies across the set of command patterns that is associated with the target user;

performing one or more filtering operations on the plurality of training items based on the first command pattern to determine a set of matching training items; and performing at least one of a ranking and a filtering operation on the set of matching training items based on the target distribution of weights to determine the first training item.

7. The method of claim 1, wherein generating the recommendation comprises:

determining that a first popularity score associated with the first training item is greater than a second popularity score associated with a second training item; and adding the first training item but not the second training item to a list associated with the recommendation.

8. The method of claim 1, wherein the first set of commands includes both a first command associated with a first software application and a second command associated with a second software application.

9. The method of claim 1, wherein the first training item comprises a video, a document, a tutorial, or a website.

10. The method of claim 1, wherein the particular task is included in the set of tasks.

11. One or more non-transitory computer readable media including instructions that, when executed by one or more processors, cause the one or more processors to automatically recommend workflows for software-based tasks by performing the steps of:

determining a set of command patterns associated with the software-based tasks, wherein each command pattern included in the set of command patterns comprises a plurality of commands associated with a different software-based task, and wherein determining the set of command patterns comprises computing at least a distribution of frequencies across one or more task-specific sets of command patterns;

computing an expected distribution of frequencies across the set of command patterns based on different distributions of frequencies across the set of command patterns, wherein the expected distribution of frequencies is associated with a target user, and each different distribution of frequencies is associated with a different user;

executing a trained machine-learning model on a first set of commands associated with the target user to generate a target distribution of weights applied to a set of tasks, wherein the trained machine-learning model maps different sets of commands to different distributions of weights applied to the set of tasks, wherein the trained machine learning model is generated using bi-term topic modeling operations based on at least two sets of commands;

determining a first training item from a plurality of training items based on the expected distribution of frequencies and the target distribution of weights;

generating a recommendation that specifies the first training item; and transmitting the recommendation to a user to assist the user in performing a particular task.

12. The one or more non-transitory computer readable media of claim 11, wherein determining the set of command patterns further comprises:

partitioning the plurality of training items across the set of tasks based on different distributions of weights applied to the set of tasks to generate a plurality of task sets;

for each task set included in the plurality of task sets, performing one or more frequent pattern mining operations on at least one set of commands to generate a distribution of frequencies across a task-specific set of command patterns; and setting the set of command patterns equal to the union of the task-specific sets of command patterns.

13. The one or more non-transitory computer readable media of claim 11, wherein the set of command patterns is determined based on a Frequent Pattern Growth algorithm and at least two sets of commands, wherein each set of commands is associated with a different training item included in the plurality of training items.

14. The one or more non-transitory computer readable media of claim 11, further comprising performing one or more topic modeling operations based on at least two sets of commands associated with the plurality of training items to generate the trained machine-learning model.

15. The one or more non-transitory computer readable media of claim 11, wherein computing the expected distribution of frequencies comprises:
    computing a plurality of similarity scores based on the different distributions of frequencies across the set of command patterns, wherein each similarity score is associated with both the target user and a different user included in a plurality of users; and
    combining the different distributions of frequencies based on the plurality of similarity scores to generate the expected distribution of frequencies.

16. The one or more non-transitory computer readable media of claim 11, wherein determining the first training item comprises:
    determining a first command pattern from the set of command patterns based on the expected distribution of frequencies and a first distribution of frequencies across the set of command patterns that is associated with the target user;
    performing one or more filtering operations on the plurality of training items based on the first command pattern to determine a set of matching training items; and
    performing at least one of a ranking and a filtering operation on the set of matching training items based on the target distribution of weights to determine the first training item.

17. The one or more non-transitory computer readable media of claim 11, wherein generating the recommendation comprises performing one or more ranking operations on the first training item and at least one other training item based on a popularity metric.

18. The one or more non-transitory computer readable media of claim 11, wherein the first set of commands associated with the target user includes at least two subsets of commands, wherein each subset of commands is associated with a different session associated with a different discrete portion of work.

19. The one or more non-transitory computer readable media of claim 11, wherein the particular task is not included in the set of tasks.

20. A system, comprising:
    one or more memories storing instructions; and
    one or more processors that are coupled to the one or more memories and,
        when executing the instructions, are configured to:
        determine a set of command patterns associated with a plurality of software-based tasks, wherein each command pattern included in the set of command patterns comprises a plurality of commands associated with a different software-based task, and wherein determining the set of command patterns comprises computing at least a distribution of frequencies across one or more task-specific sets of command patterns;
        compute an expected distribution of frequencies across the set of command patterns based on different distributions of frequencies across the set of command patterns, wherein the expected distribution of frequencies is associated with a target user, and each different distribution of frequencies is associated with a different user;
        execute a trained machine-learning model on a first set of commands associated with the target user to generate a target distribution of weights applied to a set of tasks, wherein the trained machine-learning model maps different sets of commands to different distributions of weights applied to the set of tasks, wherein the trained machine learning model is generated using bi-term topic modeling operations based on at least two sets of commands;
        determine a first training item from a plurality of training items based on the expected distribution of frequencies and the target distribution of weights;
        generate a recommendation that specifies the first training item; and
        transmit the recommendation to a user to assist the user in performing a particular task.

* * * * *